United States Patent
Al-Ansari et al.

(10) Patent No.: US 11,580,537 B2
(45) Date of Patent: Feb. 14, 2023

(54) PAYMENT INTEGRATED LOYALTY SYSTEM

(71) Applicant: PAYSTONE, INC., London (CA)

(72) Inventors: Tarique Al-Ansari, London (CA); Majid Abu Daia, London (CA); Peter Gerard Nicholas Scheyen, London (CA)

(73) Assignee: Paystone, Inc., London (CA)

( * ) Notice: Subject to any disclaimer, the term of this patent is extended or adjusted under 35 U.S.C. 154(b) by 0 days.

(21) Appl. No.: 16/749,479

(22) Filed: Jan. 22, 2020

(65) Prior Publication Data
US 2021/0224808 A1     Jul. 22, 2021

(51) Int. Cl.
| | |
|---|---|
| *G06Q 20/40* | (2012.01) |
| *G06Q 20/38* | (2012.01) |
| *G06Q 30/02* | (2012.01) |
| *G06Q 30/0226* | (2023.01) |

(52) U.S. Cl.
CPC ....... *G06Q 20/3827* (2013.01); *G06Q 20/387* (2013.01); *G06Q 20/3821* (2013.01); *G06Q 20/3823* (2013.01); *G06Q 20/407* (2013.01); *G06Q 30/0229* (2013.01)

(58) Field of Classification Search
None
See application file for complete search history.

(56) References Cited

U.S. PATENT DOCUMENTS

| | | | |
|---|---|---|---|
| 7,996,320 B2 | 8/2011 | Bishop et al. | |
| 8,332,290 B1* | 12/2012 | Venturo | G06Q 30/00 705/33 |
| 8,668,146 B1* | 3/2014 | McGhie | G06Q 20/381 235/380 |
| 9,842,345 B2 | 12/2017 | Ariff et al. | |

(Continued)

FOREIGN PATENT DOCUMENTS

| | | |
|---|---|---|
| CA | 2779774 | 11/2013 |
| EP | 2643767 | 10/2013 |

(Continued)

OTHER PUBLICATIONS

Jeff Mankoff; Why Card-Linking Matters; Oct. 18, 2017; vPromos, Inc.; https://vpromos.com/thoughtleadership.

(Continued)

*Primary Examiner* — Jacob C. Coppola

(57) ABSTRACT

A payment integrated loyalty system including a point of sale terminal comprising a card reader, a communication subsystem configured to wirelessly communicate with a payment instrument, and configured to communicate over a network with at least a first and second server. The payment integrated loyalty system includes a processor in communication with the communication subsystem and card reader, configured to receive, through the communication subsystem, a payment instrument identifier associated with the payment instrument, and obtain a fingerprint based on one-way encrypting the payment instrument identifier. The processor is further configured to receive, from the first (Continued)

server via the communication subsystem, a loyalty balance associated with the fingerprint and to complete the financial transaction based on an updated amount based on the loyalty balance.

27 Claims, 20 Drawing Sheets

(56) References Cited

U.S. PATENT DOCUMENTS

| | | | |
|---|---|---|---|
| 10,049,376 B1* | 8/2018 | Joglekar | G06Q 30/0238 |
| 10,318,980 B2 | 6/2019 | Crowe et al. | |
| 2005/0251446 A1* | 11/2005 | Jiang | G06Q 20/40 235/380 |
| 2010/0057553 A1* | 3/2010 | Ameiss | G06Q 20/387 705/14.32 |
| 2011/0068170 A1* | 3/2011 | Lehman | G06Q 30/0238 235/380 |
| 2011/0307318 A1 | 12/2011 | LaPorte et al. | |
| 2012/0059701 A1 | 3/2012 | Van der Veen et al. | |
| 2012/0101881 A1 | 4/2012 | Taylor et al. | |
| 2013/0238408 A1 | 9/2013 | Cooke et al. | |
| 2013/0282464 A1* | 10/2013 | Bradley | G06Q 30/06 705/14.27 |
| 2013/0282468 A1 | 10/2013 | Michael | |
| 2014/0180849 A1* | 6/2014 | Kimberg | G06Q 20/384 705/16 |
| 2015/0161642 A1 | 6/2015 | Pastore et al. | |
| 2015/0170182 A1* | 6/2015 | Perez | G06Q 30/0226 705/14.27 |
| 2016/0048864 A1* | 2/2016 | Beer | G06Q 30/0226 705/14.27 |
| 2016/0132918 A1 | 5/2016 | Thomas | |
| 2017/0132652 A1* | 5/2017 | Kedzlie | G06Q 30/02 |
| 2017/0161770 A1 | 6/2017 | Toumayan et al. | |
| 2017/0178174 A1 | 6/2017 | Mitchell | |
| 2017/0293907 A1* | 10/2017 | Salmon | G06Q 40/02 |
| 2017/0330217 A1 | 11/2017 | Postrel | |
| 2018/0341971 A1* | 11/2018 | Shah | G06Q 30/0227 |
| 2019/0095942 A1* | 3/2019 | Lee | G06Q 20/206 |
| 2019/0385161 A1* | 12/2019 | Gleeson | G06Q 20/24 |
| 2020/0082424 A1* | 3/2020 | Peters | G06Q 30/0239 |
| 2020/0294043 A1* | 9/2020 | Clarke | G06Q 20/4014 |

FOREIGN PATENT DOCUMENTS

| | | | | |
|---|---|---|---|---|
| KR | 20070075985 | | 7/2007 | |
| WO | WO-2008064000 A1 * | | 5/2008 | G06Q 20/12 |
| WO | WO-2017010936 A1 * | | 1/2017 | G06Q 20/207 |

OTHER PUBLICATIONS

Emily Nichols; The Magic of Credit Card-Linked Restaurant Loyalty Programs; Toast; Dec. 4, 2017; https://pos.toasttab.com/blog/credit-card-linked-loyalty-programs.

Jeff Mankoff; The Impending Battle for Card-Linking; The CardLinx Association; Sep. 22, 2016; https://cardlinx.org/impending-battle-card-linking.

* cited by examiner

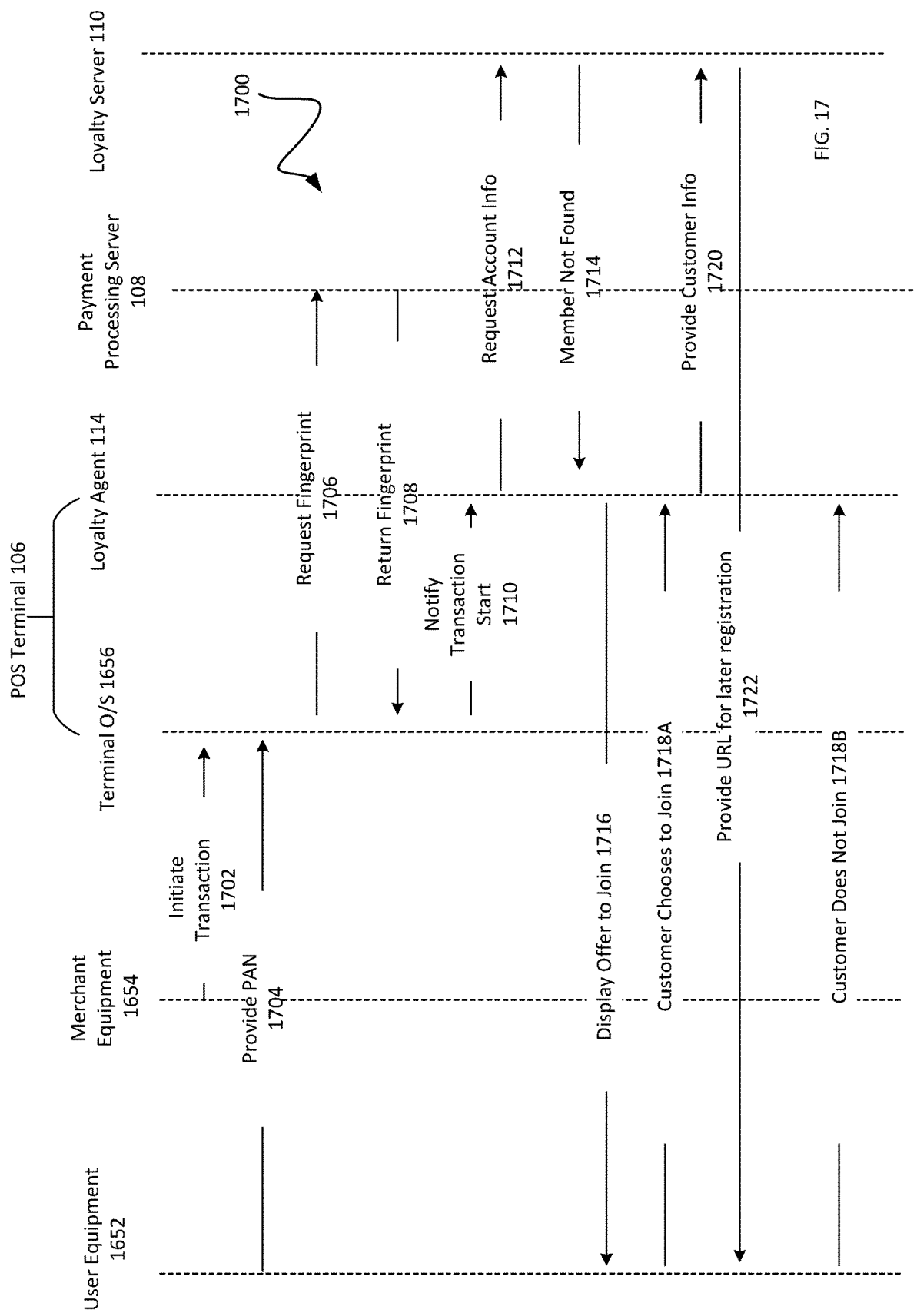

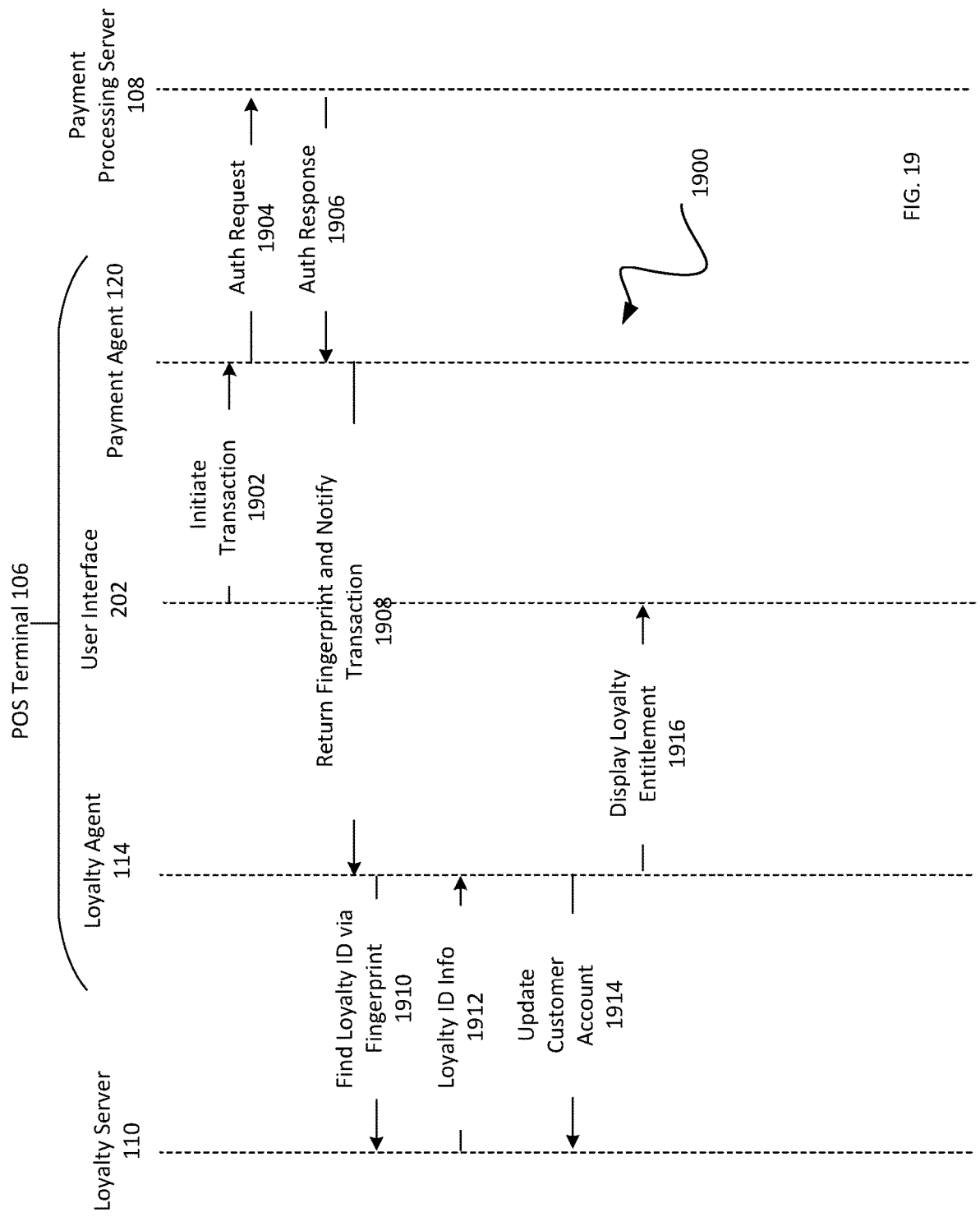

US 11,580,537 B2

PAYMENT INTEGRATED LOYALTY SYSTEM

TECHNICAL FIELD

Example embodiments generally relate to loyalty systems and methods, for example payment integrated loyalty systems and methods that do not depend on a separate loyalty card.

BACKGROUND

Loyalty systems allow a customer to accrue loyalty for purchases or engagement with a retailer or service provider. These loyalty systems provide a way for a merchant to establish a one-to-one mutually advantageous relationship with a customer. In conventional systems, the customer makes a decision to join a merchant's loyalty program and is issued a loyalty card number that uniquely identifies the customer (or "member" once they have joined the loyalty program) in the context of that merchant. The loyalty card number is carried by the member on either a physical card or an electronic card. When making purchases at any of the merchant's locations the member identifies their participation in the loyalty program by submitting their loyalty card number to the merchant before or during a payment transaction. The merchant's loyalty systems software will then accumulate points or loyalty for that member and/or provide the member an opportunity to redeem points or loyalty if applicable. Some merchants may make use of members' mobile phones to enable loyalty features via an application or app, or electronic wallet (e-wallet) card.

However, these existing loyalty systems are based on the customer having to keep a separate loyalty card number or load a dedicated loyalty application on their mobile phone. As well, many of these existing loyalty systems are tied to a single merchant. This type of dedicated loyalty application is not integrated with a payment instrument such as a credit card.

Accordingly, it would be desirable to provide a payment integrated loyalty system. It would be desirable to provide a payment integrated loyalty system which can integrate a payment instrument with one or more loyalty programs.

SUMMARY

A payment integrated loyalty system, devices and methods of operation are described.

An example embodiment includes a system comprising a point of sale terminal including: a card reader; a communication subsystem configured to wirelessly communicate with a payment instrument, and configured to communicate over a network with at least a first and second server; and a processor. The processor is in communication with the communication subsystem and card reader, and configured to receive, through the communication subsystem, a payment instrument identifier associated with the payment instrument, and to receive, via the card reader, an amount of the financial transaction. The processor is configured to obtain a fingerprint based on one-way encrypting the payment instrument identifier, transmit, to the first server via the communication subsystem, the fingerprint without transmitting the payment instrument identifier and receive, from the first server via the communication subsystem, a loyalty balance associated with the fingerprint. The processor is further configured to transmit, to the second server via the communication subsystem, the payment instrument identifier and a payment authorization request for authorization of the amount of the financial transaction, and to receive, from the second server, a response to the payment authorization request that the amount of the financial transaction has been authorized for the payment instrument identifier; and to transmit, to the first server, data representative of the amount of the financial transaction.

In accordance with an example embodiment, the processor may be configured to obtain a fingerprint whereby the processor is configured to obtain the fingerprint from the second server.

In accordance with an example embodiment, the processor may be configured to obtain a fingerprint whereby the processor generates the fingerprint.

In accordance with an example embodiment, the financial transaction is a refund transaction, wherein received loyalty balance reflects a reversal of a loyalty amount due to the refund transaction.

Another example embodiment includes a method performed by a point of sale terminal pursuant to a financial transaction, the method comprising receiving, through the point of sale terminal, a payment instrument identifier, and receiving, through the point of sale terminal, an amount of the financial transaction. The method further includes obtaining a fingerprint based on one-way encrypting the payment instrument identifier, transmitting, to a first server, the fingerprint and without transmitting the payment instrument identifier, and receiving, from the first server, a loyalty balance associated with the fingerprint. The method further includes transmitting, to a second server, the payment instrument identifier and a payment authorization request for authorization of the amount of the financial transaction, receiving, from the second server, a response to the payment authorization request that the amount of the financial transaction has been authorized for the payment instrument identifier; and transmitting, to the first server, data representative of the amount of the financial transaction.

In accordance with an example embodiment, the method may comprise a fingerprint that is a non-reversible, one-way transformation of the payment instrument identifier. In accordance with an example embodiment, the method further includes salting the payment instrument identifier, and wherein the one-way transformation includes hashing the salted payment instrument identifier.

In accordance with an example embodiment, the method may comprise, the payment instrument identifier comprising at least a primary account number (PAN).

In accordance with an example embodiment, the method may comprise the payment instrument identifier comprising at least a credit card number or a debit card number.

In accordance with an example embodiment, the method may comprise further outputting the loyalty balance to a user interface of the point of sale terminal.

In accordance with an example embodiment, the method may comprise the received loyalty balance reflecting an updated loyalty balance due to the amount of the financial transaction.

In accordance with an example embodiment, the transmitting, to the first server, the data representative of the amount of the financial transaction, is performed prior to the receiving, from the first server, the loyalty balance associated with the fingerprint.

In accordance with an example embodiment, the financial transaction is a refund transaction, the method may comprise receiving, from the first server, the updated loyalty balance which had reversed a loyalty amount due to the refund transaction.

In accordance with an example embodiment, the method may comprise the received loyalty balance reflecting current loyalty balance prior to the financial transaction.

In accordance with an example embodiment, the method may comprise receiving, from the first server, an updated loyalty balance due to the amount of the financial transaction; and outputting, through the user interface, the updated loyalty balance.

In accordance with an example embodiment, the method may comprise prompting, through the user interface, a loyalty redemption amount to be deducted from the loyalty balance, wherein the amount of the financial transaction reflects the loyalty redemption amount that is deducted. The method may further comprise receiving, from the first server, an updated loyalty balance due to the amount of the financial transaction and/or the loyalty redemption amount, and outputting, through the user interface, the updated loyalty balance.

In accordance with an example embodiment, the transmitting, to the second server, the payment authorization request for authorization of the amount of the financial transaction can be performed in response to receiving the loyalty redemption amount from the prompting.

In accordance with an example embodiment, the method may comprise the fingerprint is associated with a loyalty profile that is not associated with any user account, wherein the current loyalty balance prior to the financial transaction being accumulated from one or more previous financial transactions that was allocated to the loyalty profile and not any user account.

In accordance with an example embodiment, the method may comprise receiving, from the first server, an indication that there is no user account associated with the fingerprint and prompting, through the user interface, whether a new user account or an existing user account is to be associated with the fingerprint, and further transmitting, to the first server, data indicative of the new user or account or the existing user account for the first server to associate the fingerprint with the new user account or the existing user account. In accordance with an example embodiment, the method may comprise: receiving, from the first server, an indication that there is user account associated with the fingerprint; receiving, from the first server, an indication that there no loyalty account associated with the fingerprint; prompting, through the user interface, an existing registration information of the user account to be used to register for a new loyalty account without prompting any registration form; and transmitting, to the first server, a request including the existing registration information of the user account for the first server to associate the existing registration information with the new loyalty account.

In accordance with an example embodiment, the method may comprise: receiving, from the first server, an indication that there is no user account associated with the fingerprint; prompting, through the user interface, an existing registration information of the user account; and transmitting, to the first server, a request including the existing registration information of the user account for the first server to associate one or more loyalty accounts of the user account with the fingerprint.

In accordance with an example embodiment, the transmitting, to the first server, the data representative of the amount of the financial transaction can be performed in response to the receiving, from the second server, a response to the payment authorization request that the amount of the financial transaction has been authorized, and the received loyalty balance reflects an updated loyalty balance due to the amount of the financial transaction.

In accordance with an example embodiment, the data representative of the amount of the financial transaction can include a loyalty amount equivalent to the amount of the financial transaction.

In accordance with an example embodiment, the payment instrument identifier is unknown to the first server.

In accordance with an example embodiment, the payment instrument identifier is inaccessible to the first server.

In accordance with an example embodiment, obtaining the fingerprint comprises the point of sale terminal generating the fingerprint.

In accordance with an example embodiment, obtaining the fingerprint comprises transmitting the payment instrument identifier to the second server; and receiving the fingerprint from the second server.

Another example embodiment includes a method performed by a server pursuant to a financial transaction, the method comprising receiving, from a point of sale terminal that is processing the financial transaction by way of a payment instrument identifier, a fingerprint that is a hash of the payment instrument identifier, the payment instrument identifier being unknown to the server. The method further includes receiving data representative of the amount of the financial transaction, determining a loyalty balance associated with the fingerprint, and transmitting, to the point of sale terminal, the loyalty balance associated with the fingerprint.

In accordance with an example embodiment, determining the loyalty balance comprises determining an updated loyalty balance due to the amount of the financial transaction.

In accordance with an example embodiment, determining the loyalty balance comprises determining the current loyalty balance prior to the financial transaction.

In accordance with an example embodiment, determining the loyalty balance further comprises determining a loyalty profile associated with a user account.

In accordance with an example embodiment, determining the loyalty balance further comprises determining that a loyalty profile is not associated with a user account, and the method further comprises transmitting, to the point of sale terminal, an indication that there is no user account associated with the fingerprint, and receiving, from the point of sale terminal, data indicative of a new user or account or an existing user account for the server to associate the fingerprint with the new user account or the existing user account.

In accordance with an example embodiment, the server does not receive the payment instrument identifier.

BRIEF DESCRIPTION OF THE DRAWINGS

For a more complete understanding of example embodiments, reference is now made to the following detailed description of example embodiments taken in conjunction with the accompanying drawings, in which:

FIG. 17 is a flow diagram showing messages using the payment integrated loyalty system of FIG. 1 to register for a loyalty system in accordance with another example embodiment.

FIG. 19 is a flow diagram showing messages using the payment integrated loyalty system of FIG. 1 in response to reversed transactions in accordance with another example embodiment.

The same reference numbers may have been used in the drawings and the following detailed description to refer to similar elements.

DETAILED DESCRIPTION OF EXAMPLE EMBODIMENTS

A payment integrated loyalty system, devices and methods of operation are described. Loyalty systems enabled by the payment integrated loyalty system include points, stars, rewards, punch cards, etc.

Figure 1:
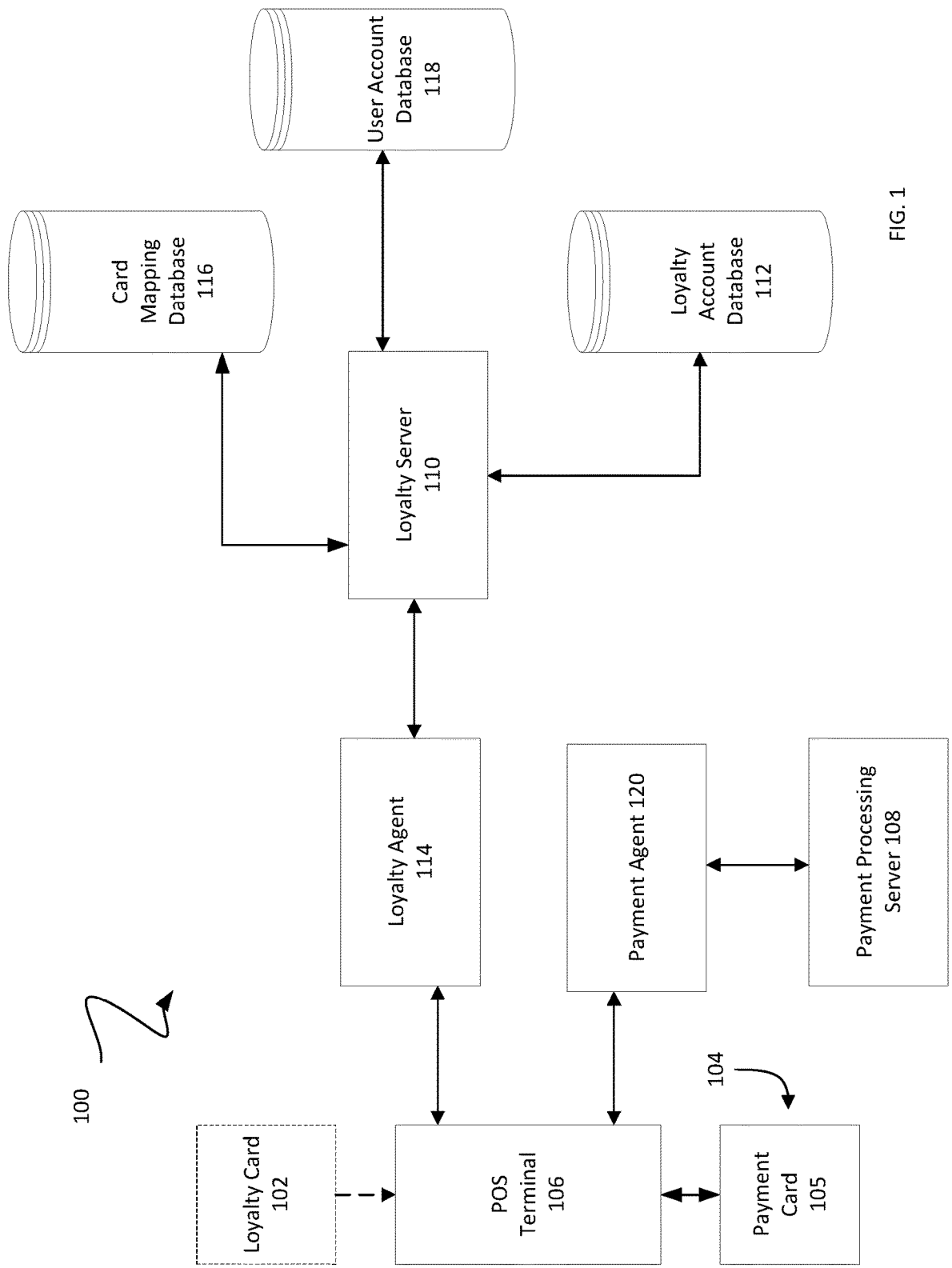
FIG. 1 is a schematic block diagram of a payment integrated loyalty system.

FIG. 1 is a schematic diagram of an example embodiment of a payment integrated loyalty system 100. Payment integrated loyalty system 100 can process and read a payment instrument 104. An example of the payment instrument 104 is a payment card 105 or a virtual payment instrument such from a mobile communication device configured with near field communication (NFC) or other suitable protocol for providing the payment instrument identifier. Payment integrated loyalty system 100 may also be configured to handle legacy systems that may include a loyalty card 102. In example embodiments, system 100 allows for the use of multiple payment cards 105 or multiple loyalty cards 102 in some examples. In some examples, payment instrument 104 includes a unique identifier that is readable by the point of sale (POS) terminal 106. In some examples, the payment instrument 104 includes an onboard processor and wireless communication subsystem which is able to communicate with the POS terminal 106, sometimes referred to as a smart card or a smart chip. The payment instrument 104 may include a readable magnetic stripe, which stores the unique identifier retrieved by a magnetic card reader of the card reader module 1872.

The POS terminal 106, receives, from a merchant or customer of the user interface 202 (FIG. 18), a request to complete a financial transaction. The request can be provided by the merchant or customer to the POS terminal 106 and includes at least an amount of the financial transaction. The request to complete the financial transaction may include or be sent contemporaneous with a request to allocate loyalty. For example, the POS terminal 106 may receive a request that includes a price of a service to be delivered by a merchant and a request to allocate loyalty based on the price of the service. The request(s) received by the POS terminal 106 may include information required to process the financial transaction and allocation request, such as merchant account information. The POS terminal 106 may also receive, pursuant to the request, information required by the merchant for record keeping purposes, such as a transaction number.

Figure 18:
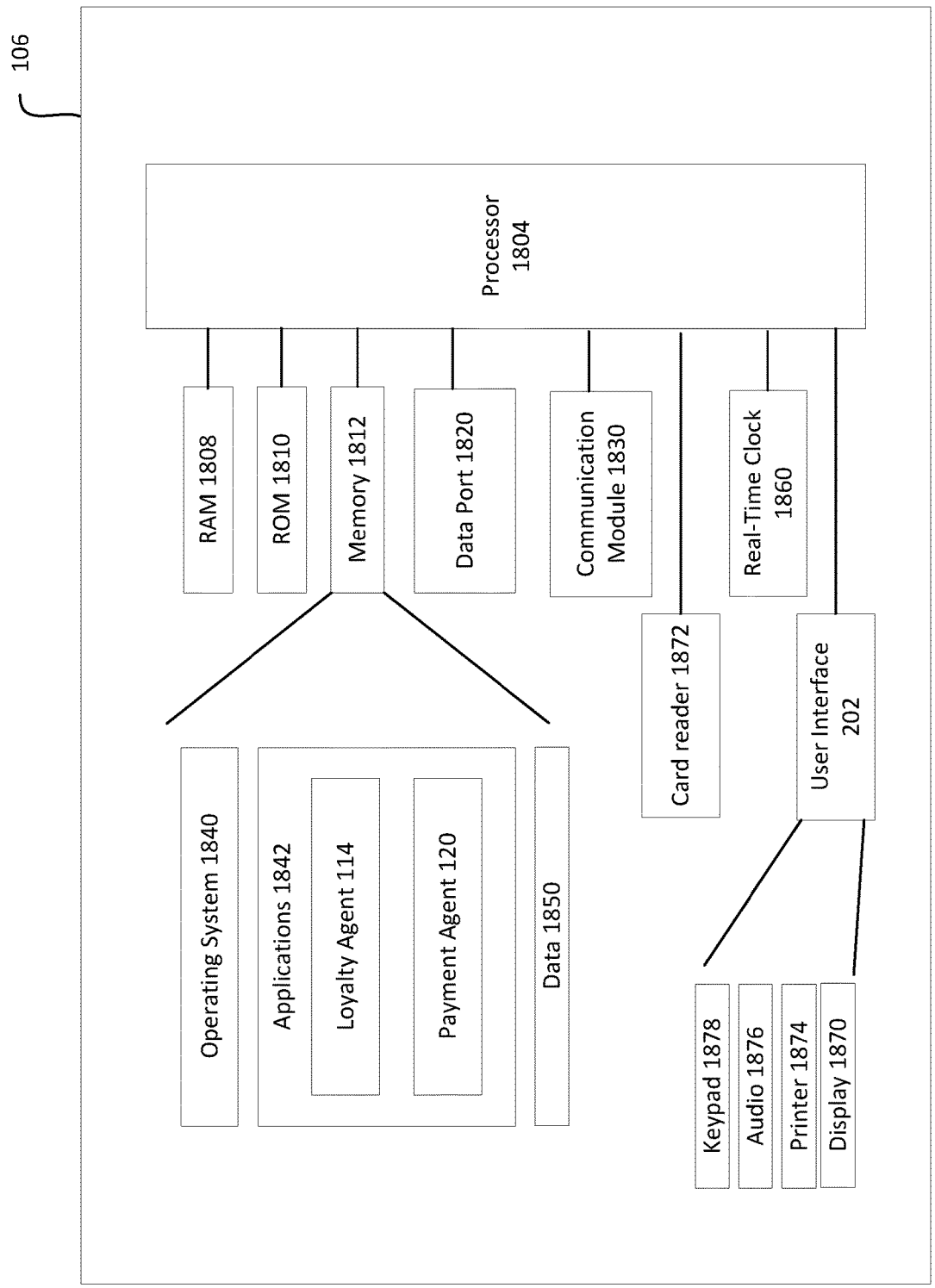
FIG. 18 is a simplified block diagram illustrating an example point of sale terminal in accordance with example embodiments.

Referring now to FIG. 18, an example embodiment of the POS terminal 106 is shown. The POS terminal 106 includes at least one processor 1804 that controls the overall operation of the POS terminal 106. The processor 1804 is coupled to a plurality of components via a communication bus (not shown) which provides a communication path between the components and the processor 1804. The POS terminal 106 may also include any one of or any combination of Random Access Memory (RAM) 1808, Read Only Memory (ROM) 1810, a persistent (non-volatile) memory 1812 which may be flash erasable programmable read only memory (EPROM) ("flash memory") or other suitable form of memory. The POS terminal 106 also may include a data port 1820 such as a serial data port (e.g., Universal Serial Bus (USB) data port), a communication subsystem 1830, and a real-time clock (RTC) 1860.

The communication subsystem 1830 may include any combination of a long-range wireless communication subsystem, a short-range wireless communication subsystem, or a wired communication subsystem (e.g., Ethernet or the like). The long-range wireless communication subsystem includes one or more radio frequency (RF) transceivers for communicating with a radio access network (e.g., cellular network). The RF transceivers may communicate with any one of a plurality of fixed transceiver base stations of a cellular network within its geographic coverage area. The long-range wireless communication subsystem may also include a wireless local area network (WLAN) transceiver for communicating with a WLAN via a WLAN access point (AP). The WLAN may include a Wi-Fi wireless network that conforms to Institute of Electrical and Electronics Engineers (IEEE) 802.11x standards (sometimes referred to as Wi-Fi®) or other communication protocol. The short-range communication subsystem may include devices, associated circuits and components for providing various types of short-range wireless communication such as Bluetooth™, RFID (radio frequency identification), near field communication (NFC), IEEE 802.15.3a (also referred to as Ultra-Wideband (UWB)), Z-Wave, ZigBee, ANT/ANT+ or infrared (e.g., Infrared Data Association (IrDA) communication).

The communication subsystem 1830 of the POS terminal 106 may include one or more antennas, a processor such as a digital signal processor (DSP), and local oscillators (LOs). The specific design and implementation of the communication subsystem 1830 is dependent upon the communication technologies implemented by the POS terminal 106. Data received by the POS terminal 106 may be decompressed and decrypted by a decoder (not shown).

Operating system software 1840 executed by the processor 1804 is stored in the persistent memory 1812 but may be stored in other types of memory devices, such as ROM 1808 or similar storage element. A number of applications 1842 executed by the processor 1804 are also stored in the persistent memory 1812. The applications 1842 may include the loyalty agent 114, responsible for actions to allocated loyalty entitlements, and a payment agent 120, responsible for completing financial transactions. Data 1850 can be used to store data relied upon or collected by the applications. Other applications are also stored in the memory 1812. The loyalty agent 114 and the payment agent 120, when executed by the processor 1804, allow the POS terminal 106 to perform the methods described herein.

As described herein, the loyalty agent 114 can be operated by the POS terminal 106 while other applications are in operation, running in the background. In some embodiments, for example, the loyalty agent 114 may be configured to be able to collect data from other running applications regarding customer interactions, and use the collected data to carry out the methods described herein.

The POS terminal 106 also includes a user interface 202. The user interface 202 may include a plurality of modules for receiving customer input or notifying a customer. For example, the user interface 202 may include any one of a display module 1870, a printer module 1874, an audio module 1876 for receiving and generating audio, a keypad module 1878, a tactile feedback module (not shown) or other physical feedback modules, independently or in any combination, for interacting with and receiving customer input. For example, the user interface 202 may include the display module 1870 and the keypad module 1878, allowing a customer to enter a personal identification number (PIN) combination upon a prompt (typically a 4-digit PIN). In some examples, the display module 1870 is a touchscreen. In some examples, a card reader module 1872 is configured for extracting at least a payment instrument identifier from a payment instrument 104 having a magnetic strip. The card reader module 1872 can also include an RFID reader or smart chip reader that can be configured with Near Field Communication (NFC) communication protocol, to receive the payment instrument identifier from the payment instrument 104 or mobile device.

Referring again to FIG. 1, the financial transaction, in order to be completed, requires the information stored on the payment instrument 104 of a customer. The payment instrument 104 can be a credit card, a debit card, a gift card, or any other card or communication device (such as a cellphone with a payment application, for example, WeChat™) configured for completing the financial transaction. The payment instrument 104 may include or convey information via a 2D or 3D barcode, magnetic encoding such as a magnetic stripe, resident smart chip (including a microprocessor and RFID antenna), serial number which can be manually inserted or optically scanned, and so forth. The payment instrument 104 that provides the payment instrument identifier can also be communicated by a NFC (or other wireless communication protocol) enabled mobile communication device having stored thereon (or access to) the payment instrument identifier.

The POS terminal 106, in example embodiments via the payment agent 120, receives a payment instrument identifier from the payment instrument 104. In example embodiments, the payment agent 120 is configured to send the payment instrument identifier to the payment processing server 108 that administers the authorizations for the payment instrument 104 to complete the financial transaction.

The payment agent 120, in example embodiments through the user interface 202 or the card reader module 1872, may receive the payment instrument identifier from the payment instrument 104 via a physical or wireless communication scheme. For example, the user interface 202 may receive the payment instrument identifier via the customer entering a number manually. In example embodiments, the payment agent 120 receives the payment instrument identifier through a module of the POS terminal 106, for example, such as a customer swiping a payment instrument 104 along the card reader module 1872. The payment agent 120 may receive the payment instrument identifier through the communication subsystem 1830, for example, via an NFC communication from the payment instrument 104 to the communication subsystem 1830. In example embodiments, a computing device, such as a NFC enabled mobile phone (not shown here), is used to communicate the payment instrument identifier to the payment agent 120 via the communication subsystem 1830.

In some example embodiments, the payment agent 120, after receiving the payment instrument identifier from the payment instrument 104, transmits, to the payment processing server 108, a payment authorization request for authorization of the amount of the financial transaction. The payment authorization request includes at least the payment instrument identifier, and may include further information required to complete the financial transaction. The information required to complete the financial transaction can, for example, include the amount of the financial transaction, merchant identifying information, Personal Identification Number (PIN) passcodes, and so forth. The payment processing server 108, in response to receiving the information required to complete the financial transaction from the payment agent 120, determines whether to authorize the financial transaction. The payment processing server 108 transmits a response to the payment agent 120 indicating whether the financial transaction has been authorized. For example, the payment processing server 108 can determine whether there are sufficient funds or credit limits in association with the payment instrument 104, in which case the financial transaction is authorized.

The POS terminal 106 may be configured to have the user interface 202 notify a customer of the response from the payment processing server 108. In example embodiments in which the user interface 202 is part of the POS terminal 106, the notification may include displaying a message on the POS terminal 106 indicating whether the payment was authorized. The notification can include the manifesting of a physical phenomena, depending on the available functionality of the user interface 202, such as audio (e.g., voice, buzzing), display screen (which can include a touchscreen), or other physical effect. In example embodiments, the notification includes sending a message, such as a text, email or other form of communication. In example embodiments in which the user interface 202 is on the POS terminal 106 which is a customer device or customer equipment, the user interface 202 may similarly display a notification on the POS terminal 106 device based on available capability.

In example embodiments of the payment integrated loyalty system 100, upon receipt of the payment instrument identifier based on the payment instrument 104, the payment agent 120 is configured to generate a one-way hash (which can be referred to as a "fingerprint") of the payment instrument identifier (or data based on the payment instrument identifier). In example embodiments, the loyalty agent 114, or another application running on the POS terminal 106 generates the one-way hash. In some example embodiments, the fingerprint is generated by the payment processing server 108. The payment processing server 108 may generate the fingerprint in response to a specific request or as part of the process of completing the financial transaction. The fingerprint is suitable for requests based on the payment instrument 104 because it is generally not possible to recover or decrypt the payment instrument identifier from the fingerprint. Therefore, the fingerprint does not contain sensitive information, such as the payment instrument identifier. In example embodiments, the payment agent 120 does not send the payment instrument identifier to the loyalty server 110, securing the payment instrument identifier, which is typically considered sensitive information. Furthermore, as described in greater detail herein, the fingerprint is used for loyalty programs by increasing functionality of the payment instrument 104 to include loyalty functionality, so that the customer does not require a separate loyalty card 102. With the use of a fingerprint, a customer may be able to use the payment instrument 104 to complete a financial transaction, and to complete a loyalty transaction (whether redemption, accumulation, or otherwise) at a plurality of POS terminals 106 and for a plurality of loyalty systems.

The fingerprint is considered unique to the payment instrument 104 and the payment instrument identifier. The payment integrated loyalty system 100 can utilize the fingerprint to ensure accurate loyalty redemption. The fingerprint may ensure that, (1) the same fingerprint can be returned on every transaction including purchases and refunds, (2) The same fingerprint can be returned regardless of the merchant's location either online or at one or more of the merchant's physical locations, (3) the same fingerprint can be returned across all merchants in the payment network regardless of whether they are participating in the loyalty system or not, (4) the fingerprint is simple enough to be transferable through various types of POS terminal 106 or payment processing systems (and can be a compact size, such as 256 characters in some examples, and more or less than 256 characters is other examples), (5) the fingerprint does not include any personally identifiable information about the customer or their payment method, and (6) the fingerprint cannot itself be used to conduct a payment.

In example embodiments, the fingerprint is generated by at least one-way encrypting the payment instrument identifier (or in some examples, data based on the payment instrument identifier). In an example embodiment, the one-way encrypting can be a hashing algorithm. In various example embodiments, any suitable hash algorithm may be used, in which cryptographic security and reasonable performance are obtained at the moment of the financial transaction without adding too much latency. For example, a secure hash algorithm (SHA) algorithm, such as SHA-256 or SHA-512 may be used, as understood in the art. In order to operate within the payment integrated loyalty system 100, the payment agent 120 may be required to implement particular hashing algorithm characteristics. For example, the payment integrated loyalty system 100 may require as a characteristic of the hash algorithm selected that a certain output space size is used in order to ensure unique outcomes for the payment instrument identifiers. The output space size will vary depending on the understood computational power available to defeat the system. The output space size may depend on the amount of unique individual account identifiers, conveyed by the payment instrument 104 as part of the payment instrument identifier, required to complete the financial transaction. For example, at current levels a hash algorithm with an output space size of 256 bits may be used. It may be that as computational power increases, hash algorithms with hash spaces in excess of 256 bits provide a reasonable trade off between cryptographic security and performance.

The payment integrated loyalty system 100 may require as a characteristic of the one-way encrypting technique that certain input conditions be satisfied. For example, in order to generate the fingerprint, the payment agent 120 may require that the payment instrument identifier (e.g. Primary Account Numbers or PANs) used to generate the fingerprint be altered in order to align with a target trade off between cryptographic security and performance. For example, the payment agent 120 may be required to supplement the payment instrument identifier with further noise or values prior to generating the fingerprint (e.g. increasing the input space size). In example embodiments, the payment instrument identifier is supplemented via salting to achieve a particular length. For example, the POS terminal 106 may be configured to apply a hash algorithm on an input with a size of 256 bits. In order to achieve member recognition across different merchants the same salt algorithm (having the same salt value) and hash algorithm may be required to be consistently applied by every payment agent 120 in the payment integrated loyalty system 100. Examples of defining, securing and updating the salt value include random number generation of the salt value or predefined salt value selection, which is known to the POS terminal 106 (and other POS terminals 106). In other examples, when the payment processing server 108 generates the hash and salts the hash, the salt value or predefined salt value selection is known to the payment processing server 108.

The payment agent 120 may communicate the fingerprint to the loyalty agent 114 in order to administer and update loyalty system entitlements. The payment agent 120 communicates the fingerprint without transmitting the payment instrument identifier. In example embodiments, the payment instrument identifier is unknown to the loyalty agent 114, and is inaccessible to the loyalty agent 114.

In order to administer loyalty system entitlements to third party loyalty, the payment integrated loyalty system 100 may be configured to update a loyalty account database 112. The loyalty account database 112 may store loyalty system accounts, which can include of or be related to registration information, loyalty transaction logs, loyalty entitlement determiners, and a reward program account status. For example, the Air Miles™ loyalty account database 112 may store a customer's address, the amount of air miles earned to date, a record of the transactions that have led to the current amount of Air Miles™, a redemption entitlement based on said points, and so forth.

In some example embodiments, the POS terminal 106 operates the loyalty agent 114. In example embodiments, the loyalty agent 114 connects with the card mapping database 116 and retrieves or receives a loyalty system account identifier related to the fingerprint. The loyalty agent 114 may then provide the loyalty server 110 with the loyalty system account identifier and data pertaining to the financial transaction. In example embodiments, the loyalty agent 114 transmits the fingerprint and at least some data pertaining to the financial transaction to the loyalty server 110. The loyalty server 110 thereafter connects with the card mapping database 116 and receives or retrieves a loyalty system account identifier related to the fingerprint. The loyalty server 110 subsequently connects with the loyalty account database 112 to allocate loyalty system entitlements based on the data pertaining to the financial transaction and the retrieved loyalty system account identifier.

In example embodiments, the loyalty server 110 operates the loyalty agent 114. Therefore, as described above, the payment instrument identifier is unknown and inaccessible to the loyalty server 110. If the loyalty server 110 operates the loyalty agent 114, the POS terminal 106, via the payment agent 120 or a separate application, may be configured to transmit the fingerprint to the loyalty server 110.

In some examples, the loyalty agent 114 may be connected through one or more communication networks to the loyalty server 110, the POS terminal 106, the loyalty account database 112, a card mapping database 116, and a customer account database 118.

Figure 12:
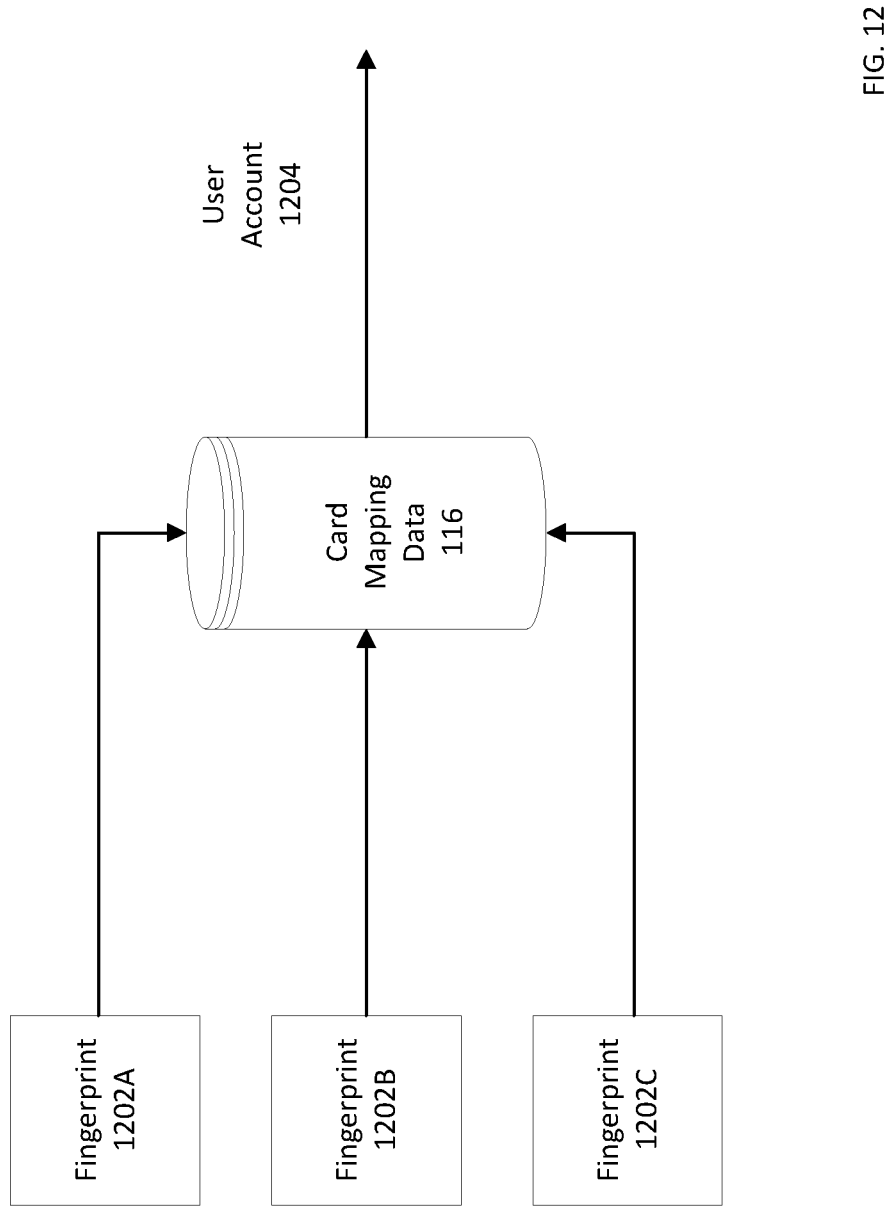
FIG. 12 is a schematic diagram of the card-mapping database in accordance with an example embodiment.

The card mapping database 116 stores information capturing the interrelation between fingerprints and customer accounts. A single customer account may be related to multiple fingerprints. For example, the card mapping database 116 may include information that a particular customer account is related to five separate fingerprints, and therefore five separate payment cards or methods 105. Referring now to FIG. 12, a detailed example of the card mapping database 116 is shown as determining that three fingerprints, 1202A, 1202B and 1202C, are related to a single customer account 1204.

In example embodiments, the card mapping database 116 is further used to store customer account information. As a single customer account may be used to participate in a variety of loyalty systems, the card mapping database 116 may act as a store of the aggregate meta-information related to the loyalty systems. For example, a single customer account can be used to manage entitlements to multiple loyalty system registrations for the customer, such as independent loyalty systems including Air Miles™, retailer specific systems such as Delta SkyMiles®, financial intuition systems such as Chase Ultimate Loyalty®, and so forth. The card mapping database 116 can collect meta-information for each loyalty system registration. The stored customer account information may include information relevant to accessing or updating the loyalty system registrations, the status of the reward system registrations such as expiry, and so forth.

The card mapping database 116 may, in addition to the customer account information described above, store any and all information stored in a third party reward account database 112, allowing the customer to access information from any loyalty system associated with the customer account in a single location. The card mapping database 116 may also store, for example, aggregate information pertaining to the individual loyalty systems, the fingerprints used to access particular loyalty systems, and so forth.

In example embodiments, the card mapping database 116 is limited to storing information capturing the interrelation between fingerprints and customer account, and the remainder of the customer account information described above is stored on a customer account database 118.

If the card mapping database 116 determines that there is a customer account related to a fingerprint, the card mapping database 116 is configured to communicate the at least some information based on the customer account to either the loyalty server 110 or the loyalty agent 114. The information based on the customer account can include the loyalty system account identifier, a loyalty balance(s) associated with the particular loyalty program(s) (where the fingerprint may be associated with a plurality of loyalty programs, for example multiple merchant specific loyalty programs), or any information required by the loyalty agent 114 or loyalty server 110 to determine the appropriate reward account database 112 to communicate with in order to administer loyalty system entitlements for the customer account.

The loyalty agent 114 or loyalty server 110, relying upon the information provided by the card mapping database 116, communicates with the appropriate loyalty account database 112 and request allocation of loyalty system entitlements.

The loyalty server 110 and loyalty agent 114 are configured to be able to, and to have authorization to access any active reward account database 112 on behalf of the customer. For example, the loyalty server 110 may utilize different application programming interfaces (APIs) or interfaces to access a particular customer's loyalty entitlements stored in the reward account database 112.

As a result, in example embodiments, the payment integrated loyalty system 100 does not require any loyalty card 102 in order to administer loyalty program entitlements.

Third parties, such as an independent loyalty system operator, may operate the loyalty server 110. For example, the loyalty server 110 may be a loyalty processor operated by Air Miles™. The loyalty server 110 may be operated by the payment integrated loyalty system 100, and communicate with third party operated loyalty account databases 112, which administers the third party loyalty systems.

In example embodiments, the payment integrated loyalty system 100 is configured to use both the payment instrument 104 as well as the loyalty card 102 to accommodate legacy systems or legacy examples that still use a loyalty card 102 (or loyalty wallets that contain virtual loyalty cards or loyalty numbers). The POS terminal 106 may be configured to receive a loyalty system account identifier from the loyalty card 102. Therefore, in some examples the POS terminal 106 can be backwards compatible with a standard loyalty card 102.

The POS terminal 106, via loyalty agent 114, may be able to use to at least the loyalty system account identifier, retrieved or received from the loyalty card 102, to identify a loyalty server 110 or loyalty account database 112 that administers the respective loyalty system related to the loyalty system account identifier. In example embodiments, the POS terminal 106 provides the loyalty system account identifier to a loyalty agent 114, which can identify the appropriate loyalty server 110 or loyalty account database 112. For example, an Air Miles™ loyalty card 102 may have a loyalty system account identifier on a magnetic stripe which is read by the POS terminal 106, allowing the POS terminal 106 or loyalty agent 114 to identify the loyalty account database 112 responsible for administering the Air Miles™ loyalty system.

In example embodiments in which the payment integrated loyalty system 100 can read a legacy loyalty card 102, the card mapping database 116 may be configured to store loyalty system account identifiers as being related to a particular customer account. In examples in which the legacy loyalty card 102 is used with the payment integrated loyalty system 100, the loyalty agent 114 may be configured to query the loyalty server 110 and processes the request to allocate and subsequently update the customer account stored in the loyalty account database 118 or the card mapping database 116.

In legacy examples in which the payment integrated loyalty system 100 directly receives the loyalty card 102, the POS terminal 106 may be configured to send a request to allocate loyalty to the loyalty server 110 (directly or indirectly via loyalty agent 114), the request including the loyalty system account identifier. The loyalty server 110 may send the request to allocate loyalty to the required loyalty account database 112. Similar to the payment processing server 108, the loyalty account database 112 is configured to transmit to the loyalty server 110 a notification of whether the request to allocate loyalty was authorized. The request to allocate loyalty can be an accrual or redemption of points and or other loyalty.

Similar to payment instrument 104, in example embodiments a computing device, such as a mobile phone (not shown), can be used to provide the information transferred by the loyalty card 102 to the POS terminal 106, as in the conventional or legacy case.

Figure 2:
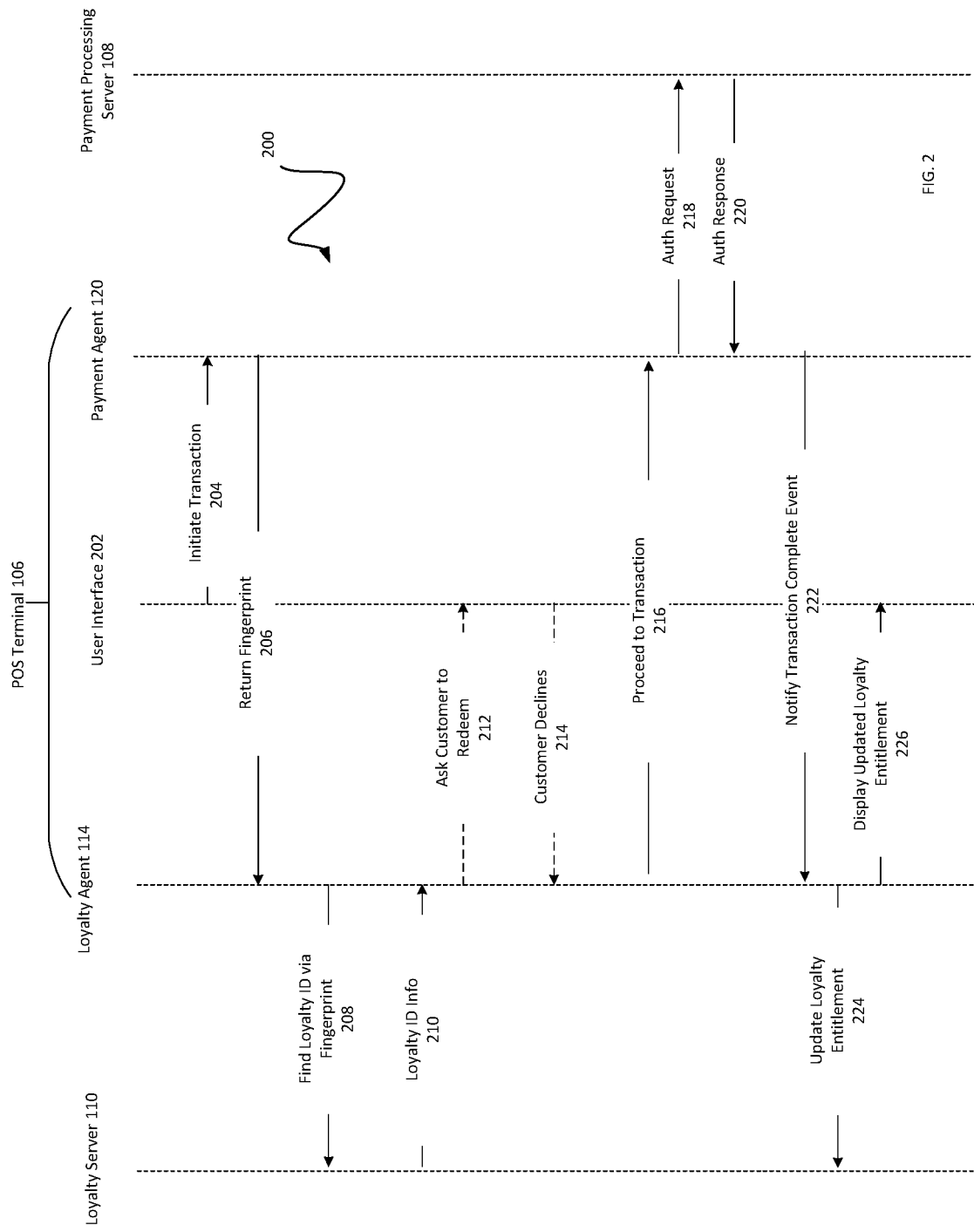
FIG. 2 is a flow diagram showing messages using the payment integrated loyalty system of FIG. 1 to accumulate loyalty entitlements in accordance with an example embodiment.
Figure 3:
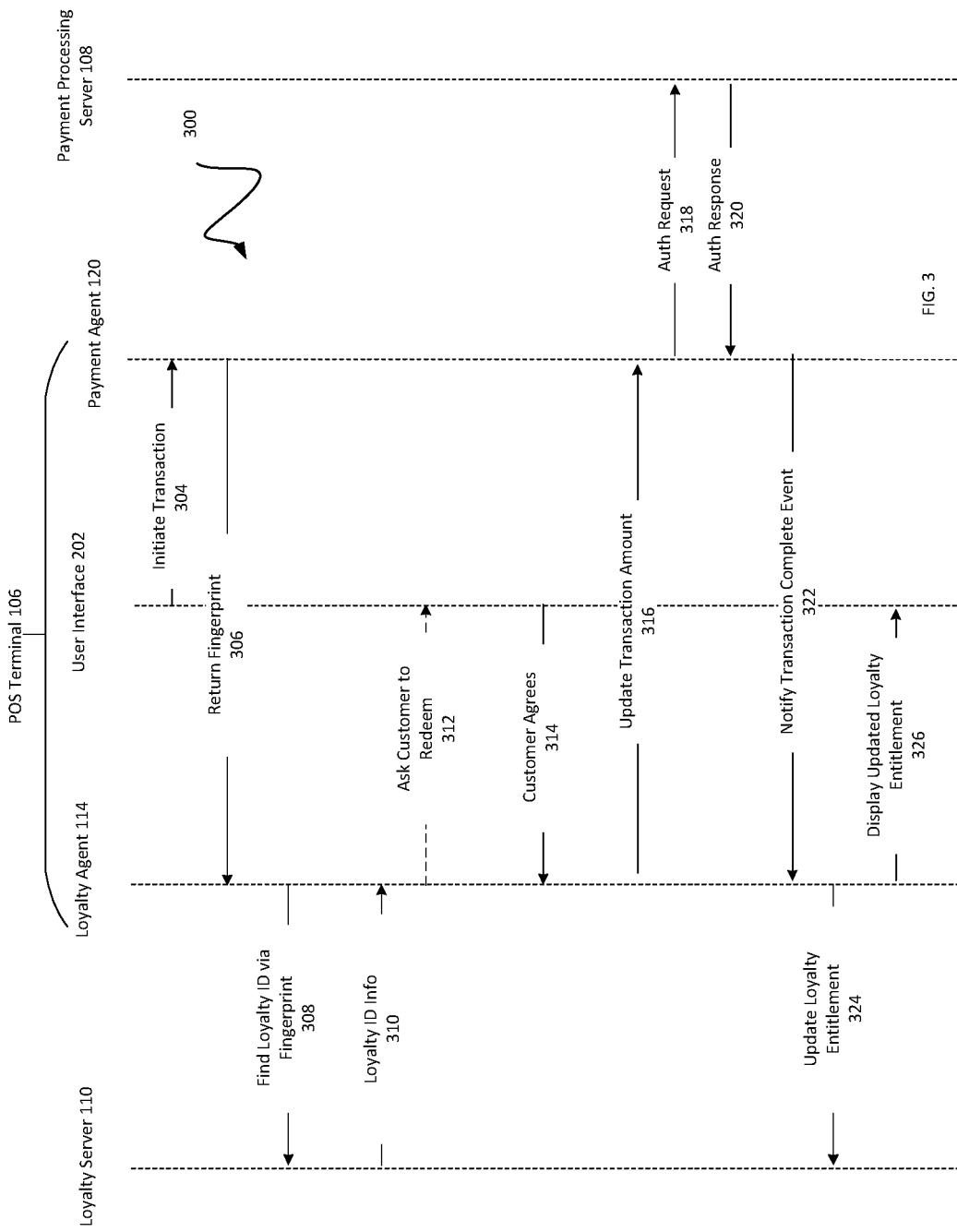
FIG. 3 is a flow diagram showing messages using the payment integrated loyalty system of FIG. 1 to redeem loyalty entitlements in accordance with an example embodiment.
Figure 4:
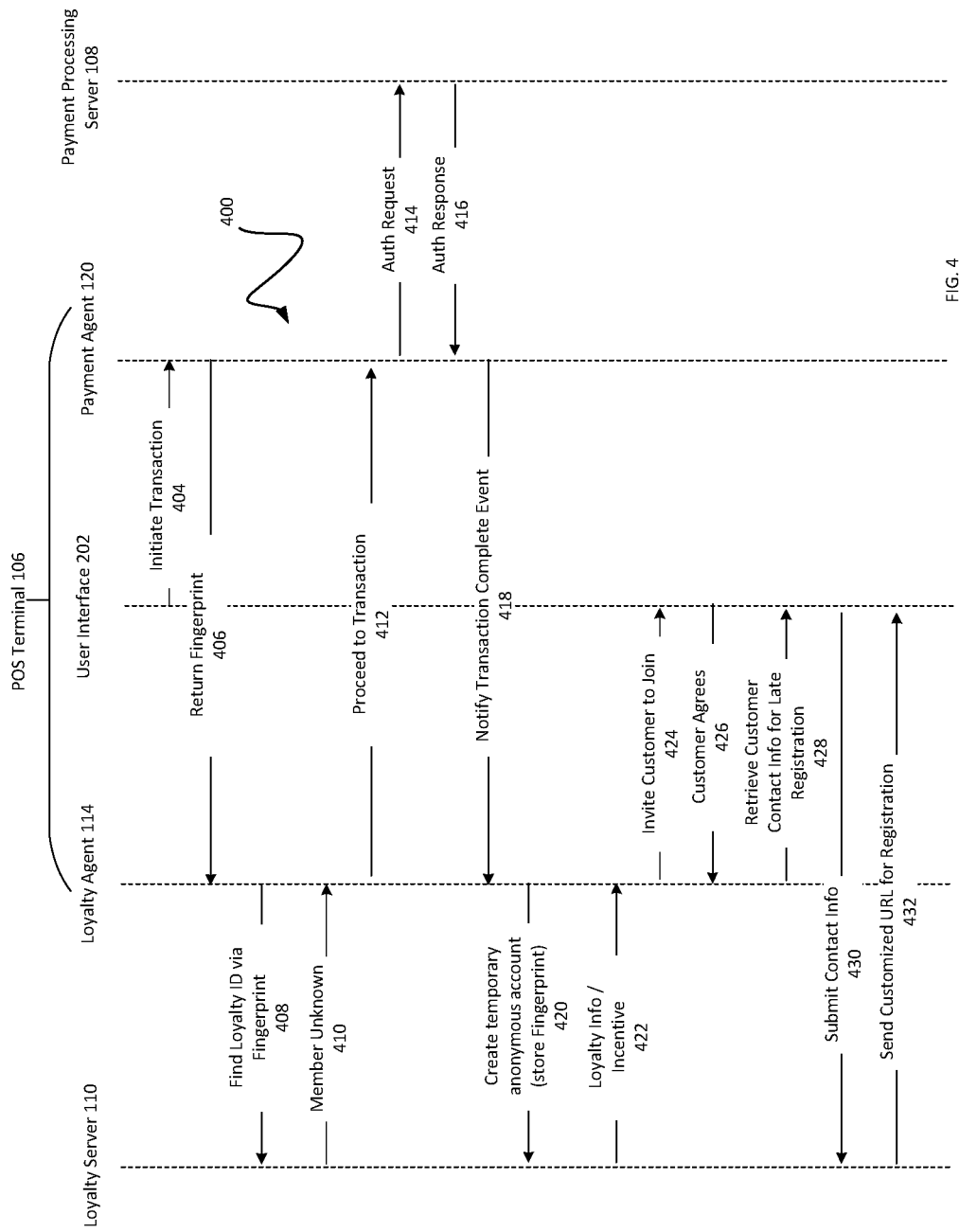
FIG. 4 is a flow diagram showing messages using the payment integrated loyalty system of FIG. 1 to register a customer in accordance with an example embodiment.

FIGS. 2, 3, and 4 describe example embodiments in which the payment integrated loyalty system 100 is used pursuant to a financial transaction if the payment instrument 104 is read by a POS terminal 106.

Reference is now made to FIG. 2, which shows a flow diagram of an example method 200 showing messages within the payment integrated loyalty system 100 to accumulate loyalty, in accordance with an example embodiment.

At step 204, the payment agent 120 receives a request to complete a financial transaction from a user interface 202. The request to complete the financial transaction can include the payment instrument identifier based the payment instrument 104, and at least an amount of the financial transaction. The payment instrument identifier can be based on a PAN of the payment instrument 104. For example, the payment instrument identifier can be the PAN (for example, a credit card number) with random numbers salted into the PAN at designated intervals up to the required input space size. In example embodiments, the payment instrument identifier may be a payment account reference (PAR), a unique number assigned to a specific cardholder regardless of PAN updates or changes. The payment instrument identifier can be determined using the process above, with the PAR substituting the PAN.

In response to receiving the payment instrument identifier, the POS terminal 106 is configured, via the payment agent 120 or otherwise, to one-way encrypt the payment instrument identifier to generate a fingerprint.

At step 206, the payment agent 120 communicates, to the loyalty agent 114, the fingerprint without transmitting the payment instrument identifier. In example embodiments, the fingerprint is sent as a request for allocation to a customer account related to the financial transaction. For example, the request for allocation can be a request to redeem loyalty entitlements, a request to accrue loyalty entitlements, a request to register for loyalty entitlements, and so forth. The request for allocation includes at least the fingerprint and the amount of the financial transaction. In example embodiments, where the rewards balance is specific to each merchant, the request for allocation may include the identity of the merchant related to the transaction. For example, the payment agent 120 may be configured with the identity of the merchant that is using it based on a registration. In example embodiments in which the loyalty agent 114 is remote to (not resident on) the POS terminal 106, the request for allocation may be sent via a wireless connection.

In response to receiving the fingerprint, the loyalty agent 114 may be configured to query the card mapping database 116 for a customer account related to the fingerprint. The card mapping database 116 may to return to the loyalty agent 114 some or all of the information stored in the related customer account if there is a related customer account. For example, the card mapping database 116 may provide the loyalty agent 114 with a loyalty ID, specific to a particular loyalty system account within the customer account, which allows the loyalty agent 114 to determine the loyalty account database 112 to which the request for allocation should be directed. In example embodiments, the card mapping database 116 provides the loyalty agent 114 with a list of loyalty system account identifiers that are related to the customer account, allowing the loyalty agent 114 to seek input from the user interface 202 as to which loyalty system account the customer would like to utilize for the financial transaction.

The card mapping database 116 may provide the loyalty agent 114 with customer account information stored in or related to the customer account other than identifying information in embodiments in which the card mapping database 116 stores customer account information. For example, the card mapping database 116 may provide the loyalty agent 114 with expected entitlement rates for a variety of loyalty systems related to the customer account.

At step 208, if the loyalty agent 114 queried the card mapping database 116, the loyalty agent 114 sends the loyalty server 110 the request for allocation with the loyalty system account identifier(s) received from the card mapping database 116. The loyalty server 110 thereafter queries the loyalty account database 112 for loyalty system account information related to the loyalty system account identifier, including for example the loyalty balance.

In example embodiments, the loyalty server 110 is responsible for communications with the card mapping database 116. In these embodiments, the loyalty agent 114 communicates the request for allocation with the loyalty server 110. The loyalty server 110 thereafter, similar to the process described above with respect to loyalty agent 114, queries the card mapping database 116 for a customer account related to the fingerprint received via the request for allocation. In these embodiments, the loyalty server 110 may query the loyalty account database 112 for loyalty system account information related to the loyalty system account identifier, including for example the loyalty balance.

At step 210, the loyalty server 110 sends no, some or all of the information related to the fingerprint to the loyalty agent 114, or the payment agent 120. The loyalty server 110 may be responsible for communication with the card mapping database 116, and the loyalty server 110 may simply send the loyalty system account identifier to the loyalty agent 114 or the payment agent 120 for further input from the customer. The loyalty server 110 may be configured in all instances to send confirmation that the loyalty system account information is valid to the loyalty agent 114, or the payment agent 120. In example embodiments in which the loyalty server 110 sends information in excess of a validation, the loyalty server 110 may transmit, for example, a loyalty balance, an amount of loyalty entitlements to be gained as a result of the financial transaction, a redemption amount, terms and conditions, important notices, and so forth.

At step 212, the loyalty agent 114, in response to receiving the information in step 210, may, via the user interface 202, prompt for an updated amount of the financial transaction.

The request in step 212 may prompt, through the user interface 202, a loyalty redemption amount to be deducted from the loyalty balance. As will be discussed in relation to FIG. 3, if, for example, the customer account has sufficient loyalty pursuant to a particular loyalty system administered by loyalty account database 112, the user interface 202 may receive a request to convert those points into a cash equivalent and update the amount of the financial transaction to reflect the loyalty redemption amount that is deducted. In cases in which the loyalty system provides for non-monetary loyalty, the updated amount of the financial transaction will be the amount of the financial transaction.

Referring again to FIG. 2, if the user interface 202 receives input not to redeem loyalty entitlements, shown as step 214, the updated amount of the financial transaction is the same as the amount of the financial transaction, and the allocation request may be referred to as an accumulation transaction.

It may be that steps 212 and 214 are optional, in the case of a customer account related to a fingerprint not having any loyalty to redeem, such that the loyalty agent 114, upon receiving the information in step 210, is able to determine that the updated amount of the financial transaction without further input.

At step 216, the loyalty agent 114 sends a message to payment agent 120 with the updated amount of the financial transaction. For example, the first message may include the amount and a request to complete the financial transaction.

At step 218, the payment agent 120 sends a payment authorization request to the payment processing server 108 for authorization of the amount of the financial transaction.

At step 220, the payment agent 120 receives a response to the payment authorization request that the amount of the financial transaction has been authorized.

At step 222, in response to receiving the authorization at step 220, the payment agent 120 may be configured to notify the loyalty agent 114 that the financial transaction has been authorized.

At step 224, the loyalty agent 114 receives the notification of authorization, and the loyalty agent 114 transmits data representative of the amount of the financial transaction to the loyalty server 110. The transmission can be a request to the loyalty server 110 to allocate to loyalty the loyalty system account based on the amount of the financial transaction or the updated amount of the financial transaction. In the example of an accumulation transaction, the updated amount of the financial transaction is the same as the amount of the financial transaction, and the loyalty system account will accrue entitlements in the loyalty system based on the financial transaction.

In response to receiving the data in step 224, the loyalty server 110 may be configured to communicate the data to the loyalty account database 112 and similarly request that the loyalty account database 112 update the customer information stored therein. Similarly, the loyalty server 110 may determine an updated loyalty balance due to the amount of the financial transaction, and transmit same to the payment agent 120, via the loyalty agent 114 or directly.

As noted above, in it may be that the loyalty agent 114 receives, at step 210, loyalty system account information including a loyalty balance and an updated loyalty balance due to the amount of the financial transaction. If the loyalty agent 114 does receive information regarding the balance or other changes in the loyalty system account information, the loyalty agent 114 may output at least the loyalty balance to a user interface 202 of the POS terminal 106. It may be that the loyalty balance is provided in step 210, and the loyalty agent 114 may determine an updated loyalty balance due to the amount of the financial transaction At step 226, the loyalty agent 114 outputs the loyalty balance to the user interface 202. In example embodiments, the user interface 202 is located remote to the POS terminal 106 and outputting includes utilizing the capabilities of the system operating the user interface 202. The loyalty balance may be an updated loyalty balance due to the amount of the financial transaction received from the loyalty server 110, as described above. Outputting may include a physical notification. For example, if the user interface 202 is on a cell phone, outputting may include buzzing a tactile feedback module at a particular rate to indicate that loyalty are available. Outputting may include digital notifications, such as a message, text, phone call, etc.

Whereas FIG. 2 illustrates an example embodiment including the payment integrated loyalty system 100 being operated to accrue loyalty, FIG. 3 is a flow diagram showing messages within the payment integrated loyalty system 100 to redeem loyalty entitlements according to method 300 (FIG. 3).

Step 304 occurs similarly to step 204 described above, step 306 occurs similarly to step 206 described above, step 308 occurs similarly to step 208 described above, step 310 occurs similarly to step 310 described above, step 312 occurs similarly to step 212 described above with respect to FIG. 2.

At step 314, the loyalty agent 114 receives a response with at least a loyalty redemption amount. The loyalty redemption amount is based on the loyalty balance, and can include some or all of the loyalty balance available for redemption. The customer may be able to use loyalty entitlements more efficiently. The loyalty agent 114 may be configured to determine the updated amount of the financial transaction based on the loyalty redemption amount. For example, a customer may wish to use only half of the available entitlements, based on a cash conversion rate of the entitlements, resulting in the loyalty redemption amount that is half of a maximum redemption amount. It may be that the customer is only presented with the option to redeem all of the loyalty.

In example embodiments the customer account contains multiple loyalty systems registrations, and the user interface 202 requests input as to which loyalty system amounts to use.

At step 316, the loyalty agent 114 sends a first message to the payment agent 120 with an updated loyalty balance due to the amount of the financial transaction and/or the loyalty redemption amount. The updated amount of the financial transaction reflects the loyalty redemption amount that is deducted. As with step 216, the first message may contain a variety of information in addition to the updated amount of the financial transaction.

Step 318 occurs similarly to step 218 described above, step 320 occurs similarly to step 220 described above, step 322 occurs similarly to step 222 described above in a manner similar to FIG. 2.

In example embodiments, not shown, steps 316, 318, 320, and 322 are performed prior to receiving an updated amount of the financial transaction. In such examples, steps 304, 306, 308, 310, 312, and 314 are carried out subsequent to the financial transaction being authorized.

At step 324, the loyalty agent 114 may provide the loyalty server 110, with the updated amount of the financial transaction based on the redemption amount. If the loyalty server 110 is operated by the third party loyalty system, the loyalty server 110 will update loyalty account database 112. In examples in which the loyalty processor 10 is operated by the payment integrated loyalty system 100, the loyalty server 110 may send the request to allocate to the loyalty account database 112. In both examples, the loyalty agent 114 may be configured to update the loyalty account database 118. The redemption of loyalty will typically result in the user interface 202 loyalty system account losing reward entitlements or purchasing power.

Step 326 of method 300 is carried out similar to step 226 in FIG. 2.

In an alternate example, the fingerprint is a card token (separate from a transaction specific card token) generated by the payment processing server 108 and received by the payment agent 120 of the POS terminal 106. For example, the financial instrument identifier is transmitted by the payment agent 120 of the POS terminal 106 to the payment processing server 108, the payment processing server 108 calculates the hash based on the financial instrument identifier to generate the fingerprint, and the payment processing server 108 transmits the fingerprint to the payment agent 120 of the POS terminal 106. The returned fingerprint can then be transmitted by the POS terminal 106 to the loyalty server 110 at step 208. The payment processing server 108, in example embodiments, performs one-way encryption, hashing, or generates a 1:1 allocation table, from the payment instrument identifier to generate the card token. In such an example, the authorized transaction may be required prior to the request for allocation. In example embodiments, the payment processing server 108 is configured to generate and provide the fingerprint to the payment agent 120 or POS terminal 106 in response to a request to complete the financial transaction. In a further example, the payment agent 120 or POS terminal 106 is required to send a request for a fingerprint separate from the request to complete the financial transaction in order to receive a fingerprint.

Figure 15:
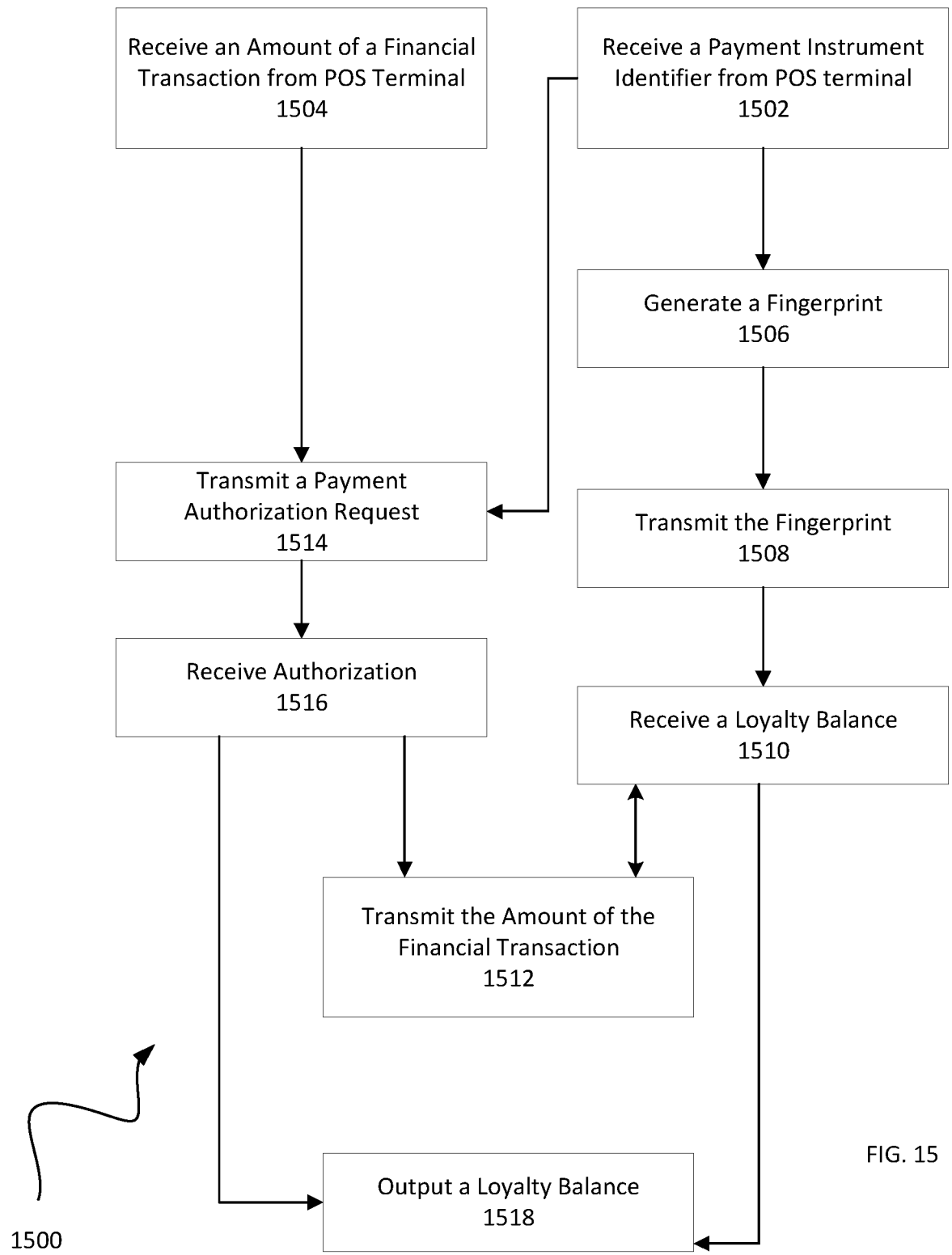
FIG. 15 is a block diagram of the payment integrated loyalty system of FIG. 1 operating in accordance with another example embodiment.

The payment agent 120 or the POS terminal 106 may be configured to request and retain a transaction specific card token, generated by the payment processing server 108, in order to facilitate after the transaction loyalty redemption, as discussed in relation to FIG. 15.

Reference is now made to FIG. 4, which illustrates a flow diagram of an example method 400 showing messages within the payment integrated loyalty system to register a customer, in accordance with an example embodiment.

As with FIG. 3, steps 404, 406, and 408 occur in a manner similar to steps 204, 206 and 208 in response to a request to complete the financial transaction.

At step 410, the loyalty agent 114 receives from the loyalty server 110, an indication that there is no customer account associated with the fingerprint provided in step 408. In embodiments the loyalty agent 114 is responsible for querying the card mapping database 116, and the response in step 410 may indicate that there is no loyalty system account identifier matching the loyalty system account identifier found in the card mapping database 116. The response may positively confirm that there is no related customer account.

In example embodiments, described in further detail below, the loyalty agent 114 may request that the loyalty server 110 create an unregistered customer account having the fingerprint upon receipt of the response in step 410. In the example embodiment shown, the loyalty agent 114 proceeds to complete the financial transaction prior to registering the customer in the payment integrated loyalty system 100.

At step 412, the loyalty agent 114 sends a message to the payment agent 120 with the updated amount of the financial transaction, which in method 400 is the amount of the financial transaction. The message requests that the payment agent 120 complete the financial transaction. As with step 212, the first message may or may not contain further information.

Steps 414, 416 and 418 are carried out in a manner similar to steps 218, 220 and 222, to complete the financial transaction.

At step 420, the fingerprint is associated with a loyalty profile that is not associated with any customer account in the payment integrated loyalty system 100, being an unregistered account. The loyalty profile that is not associated with any customer account can accumulate a loyalty balance based on subsequent financial transactions. In example embodiments, the current loyalty balance of the loyalty profile that is not associated with any customer account can accumulated from one or more previous financial transactions that were allocated to the loyalty profile and not any customer account.

In examples embodiments the loyalty server 110 is administered by a third party loyalty system, and the loyalty agent 114 may determine the relevant loyalty server 110 to send the request based on pre-configured rules. For example, the loyalty agent 114 may be configured to send this request to the loyalty program of the merchant conducting the financial transaction. In example embodiments, the loyalty agent 114 may be aware of the loyalty servers 110 that are applicable to the financial transaction, and send the request only to those loyalty servers 110. The loyalty agent 114 may send the request to all loyalty servers 110 of which it is aware.

In example embodiments, a loyalty server 110 operator may set limits on the amount of, and use of, loyalty entitlements accrued by an unregistered account. For example, the loyalty profile may be configured to accrue loyalty entitlements up to the maximum specified by the relevant loyalty server 110. In example embodiments, different loyalty servers 110 or loyalty providers (i.e. retailers) may disallow redemption of loyalty entitlements accruing to unregistered accounts.

At step 422, the loyalty agent 114 receives the response from the loyalty server 110. In example embodiments the request in step 420 was sent to multiple first servers 110, and the loyalty agent 114 may receive multiple responses. The response can include the required registration information to register the customer into a loyalty system administrated by the respective loyalty server 110. In example embodiments the loyalty server 110 is administered by the payment integrated loyalty system 100, and the response may include required registration information for the payment integrated loyalty system 100 as well as particular loyalty systems.

The required registration information may include mandatory parameters and elective parameters. For example, the required information may have mandatory parameters such as name and address and elective parameters such as contact number. In example embodiments, the required registration information includes information that the customer is required to agree or consent to, including for example terms and conditions.

The response may include an estimated loyalty balance based on the financial transaction. For example, the response may include an estimated loyalty balance that includes a promotional entitlement, a bonus entitlement, a sign-up bonus, and so forth.

At step 424, the loyalty agent 114 prompts for, through the user interface 202, whether a new customer account or an existing customer account is to be associated with the fingerprint. The prompt may include a request for the customer to join the at least one loyalty systems identified in step 422. In example embodiments, prompt includes a list of loyalty systems the customer is able to join, the required registration information, and the expected or updated loyalty balance based on the financial transaction or other information that would influence a customer to join a loyalty system.

In some examples, the required registration information includes contact information. The loyalty agent 114 may be configured to receive contact information from the customer interface in order to complete or allow a loyalty system registration at a later time. The contact information may include any one of an email, phone number, app contact information (such as Instagram™ or Facebook™ account identifier), and so forth.

At step 426, the loyalty agent 114 receives a response indicating that the customer wishes to register in at least one of the loyalty systems.

In example embodiments, the request in step 424 is limited to possible loyalty systems that the customer may register to based on the financial transaction. For example, the user interface 202 may be configured to provide only certain loyalty system registrations during promotional periods. If the request is limited by only certain reward systems, at step 432, the loyalty agent 114 requests, in a manner similar to step 424, the required registration information from the customer. As described above, the required registration information may be contact information for completing registration at a later time.

The request, pursuant to steps 424 and/or 432, may include contact information of the at least one loyalty server 110. As a result, at step 430 the customer via the user interface 202, may communicate directly with the loyalty server 110 to provide completed required registration information, bypassing the loyalty server 110. The required registration information may be contact information to be used for a later registration, for example pursuant to FIG. 10 described below. In example embodiments, the completed required registration information is provided to the loyalty agent 114 which passes the information to the at least one loyalty server 110.

In example embodiments, not shown, the payment agent 120 at step 430 transmits, to the loyalty server 110, data indicative of the new customer or account or the existing customer account for the loyalty server 110 to associate the fingerprint with the new customer account or the existing customer account.

At step 432, based on the completed required registration information, the loyalty server 110 is configured to send the user interface 202 a registration notification. The registration notification may require the customer take a confirmation action to finalize a registration to the at least one loyalty systems. For example, the registration notification may provide the user interface 202 with a customized uniform resource locator (URL), which the customer is required to click through as the confirmation action to complete the registration. In example embodiments, the confirmation action may include the actions outlined in FIG. 10 below. In example embodiments the confirmation action is performed at a later time, and the registration notification may be communicated wirelessly, for example via a text, an email, a phone call, app communication, etc. to a different user interface 202, such as the customers wireless device, based on the contact information provided previously, as described above.

Whereas FIGS. 2, 3 and 4 illustrate example embodiments include the payment instrument 104 being used with the POS terminal 106 at a vendor premises, FIGS. 5, 6, 7 and 8 describe example embodiments of the payment integrated loyalty system 100 which include the customer using a personal computing device (or user equipment) as the POS terminal 106 by accessing a web-browser, a payment website, loading a dedicated POS application, etc. In some examples, the personal computing device can be a mobile communication device.

Figure 5:
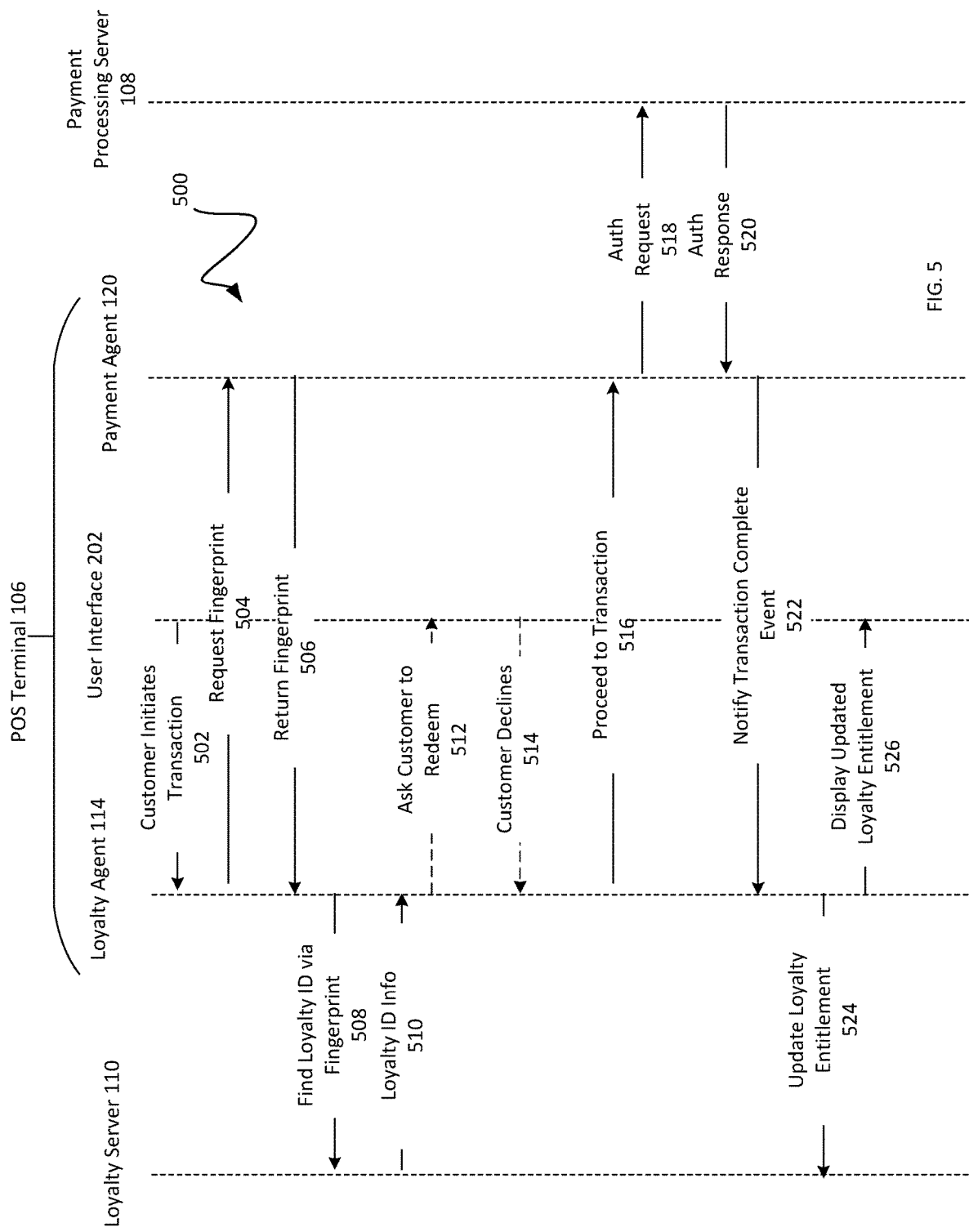
FIG. 5 is a flow diagram showing messages using the payment integrated loyalty system of FIG. 1 to accumulate loyalty entitlements in accordance with another example embodiment.

Reference is now made to FIG. 5, which is a flow diagram of an example method 500 showing messages within the payment integrated loyalty system 100 to accumulate loyalty entitlements, in accordance with an example embodiment. At step 502, the user interface 202 provides the loyalty agent 114 with the payment instrument identifier of payment instrument 104 and at least the amount of the financial transaction. In FIG. 5, the user interface 202 is located on a personal computing device that is operating as the POS terminal 106. The loyalty agent 114 may be configured to receive the payment instrument identifier and the amount of the financial transaction from the user interface 202 via an API, or other plug-in functionality. For example, the loyalty agent 114 may be integrated with a web-browser, accessed via user equipment, a payment website, and so forth.

The loyalty agent 114 at step 502 receives information that directs the loyalty agent 114 to communicate with a particular payment agent 120. The payment agent 120 may be any instance of an agent on the personal computing device communicating with the payment processing server 108 to complete the financial transaction. The particular payment agent 120 may be specified by the user interface 202 or merchant pursuant to the financial transaction. For example, a user interface 202 may be completing the financial transaction via an online website that requires a specific payment agent 120.

At step 504, the loyalty agent 114 sends a request to the payment agent 120 to generate the fingerprint based on the payment instrument identifier. For example, the fingerprint may be the returned card token from the payment processing server 108, which is unique to the payment instrument identifier. The payment agent 120 in step 504 operates similar to the payment agent 120 in step 302.

In an alternative example, the payment agent 120 may be embedded in, for example, a website (not shown), and where the payment agent 120 embedded in the website communicates with the payment processing server 108 to obtain the fingerprint.

Steps 506, 508, 510, 512, 514, 516, 518, 520, 522, 524, and 526 are performed similarly to steps 206, 208, 210, 212, 214, 216, 218, 220, 222, 224, 226, respectively, as they are described as being performed in accordance with FIG. 2.

Figure 6:
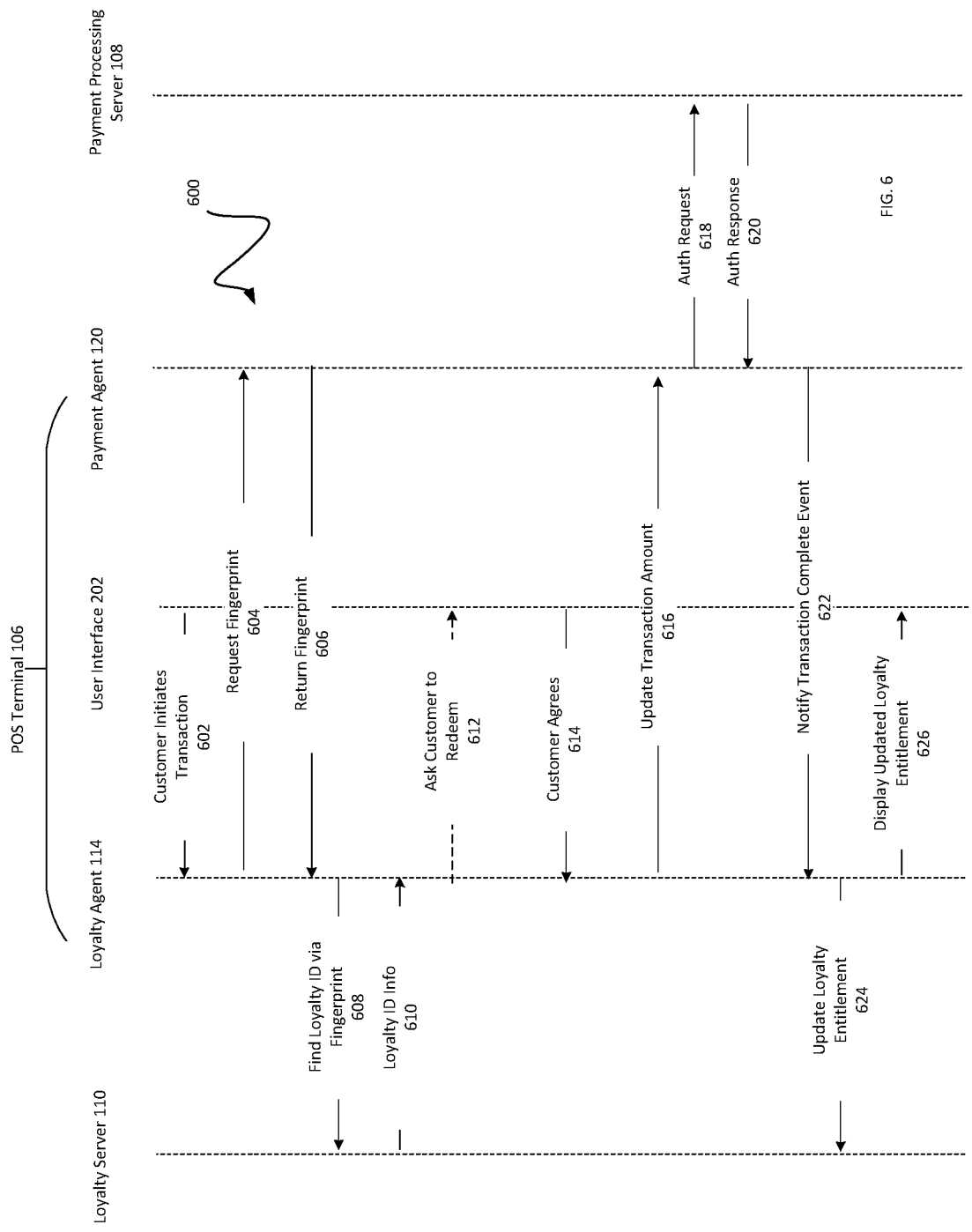
FIG. 6 is a flow diagram showing messages using the payment integrated loyalty system of FIG. 1 to redeem loyalty entitlements in accordance with another example embodiment.

FIG. 6 is a flow diagram of an example method 600 showing messages within the payment integrated loyalty system 100 to redeem loyalty entitlements, in accordance with an example embodiment. The loyalty agent 114 performs steps 602 and 604, which are analogous to steps 502 and 504 in FIG. 5. Steps 606, 608, 610, 612, 614, 616, 618, 620, 622, and 624 are performed in a manner similar to steps 206, 208, 210, 212, 314, 316, 218, 220, 222, 324, and 226, respectively, are performed as set out in FIG. 3.

Figure 7:
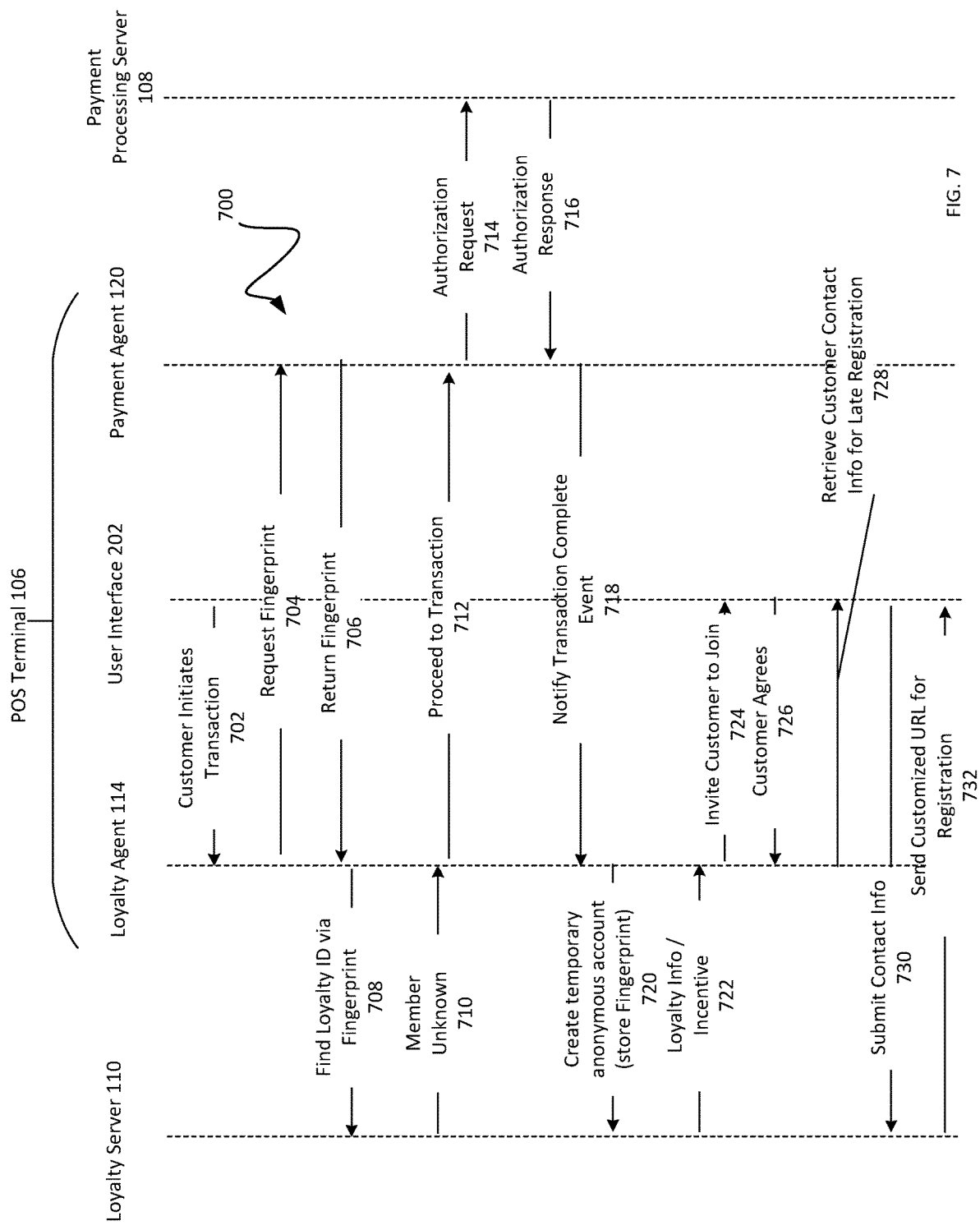
FIG. 7 is a flow diagram showing messages using the payment integrated loyalty system of FIG. 1 to register a customer in accordance with another example embodiment.

FIG. 7 is a flow diagram of an example method 700 showing messages within the payment integrated loyalty system 100 to register a customer, in accordance with an example embodiment. Steps 702 and 704 are performed, which are analogous to steps 502 and 504 in FIG. 5. Steps 706, 708, 710, 712, 714, 716, 718, 720, 722, 724, 726, 728, 730, and 732 are performed in a manner similar to steps 208, 410, 412, 218, 220, 222, 420, 422, 424, 426, 432, 430, and 432, respectively, are performed as set out in FIG. 4.

Figure 8:
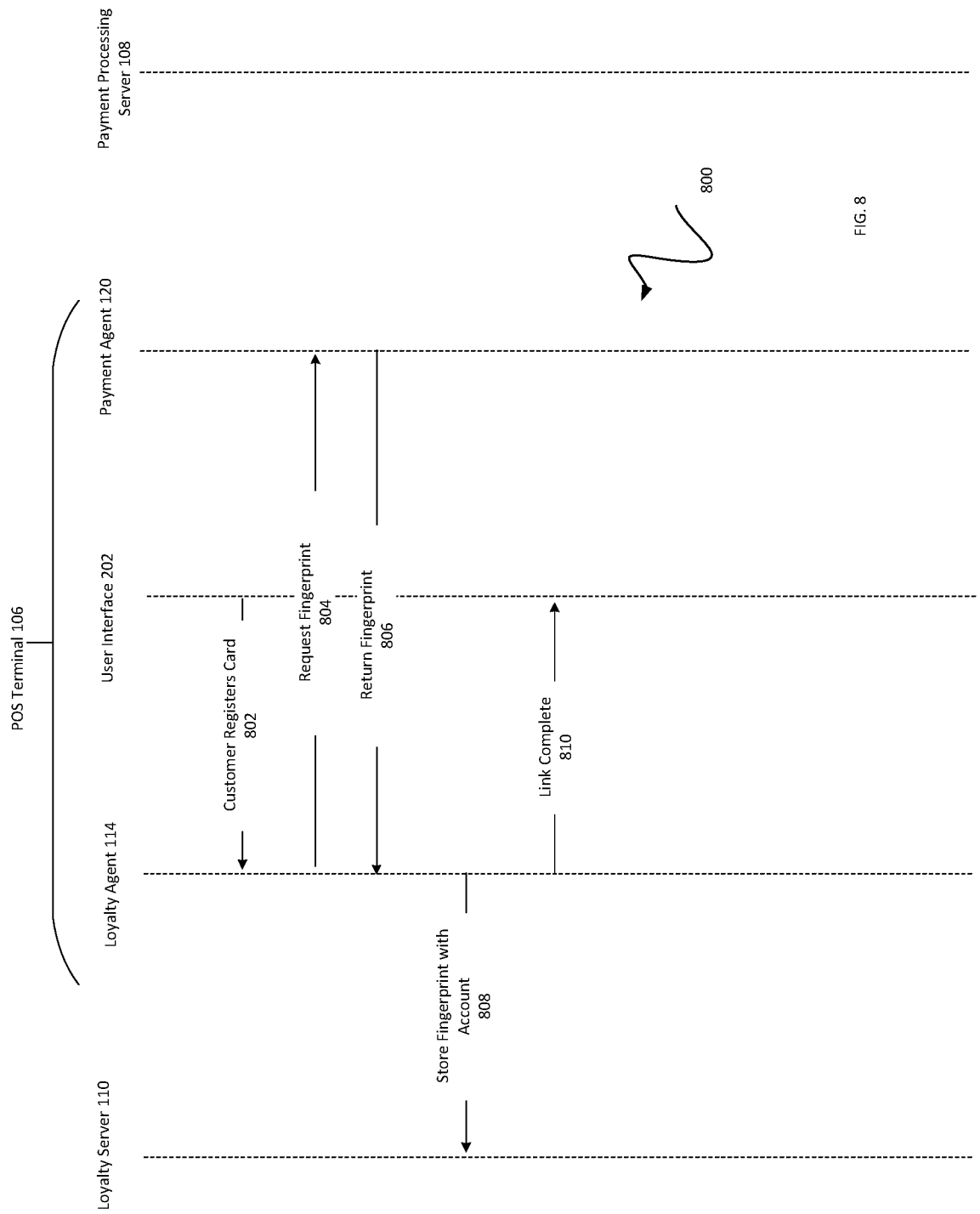
FIG. 8 is a flow diagram showing messages using the payment integrated loyalty system of FIG. 1 to link a payment card in accordance with an example embodiment.

Reference is now made to FIG. 8, which shows a flow diagram of an example method 800 showing messages within the payment integrated loyalty system 100 to link the payment card 105, in accordance with an example embodiment. The method 800 may be performed subsequent to a customer signing up for the payment integrated loyalty system 100 pursuant to FIG. 7, for example.

At step 802, the user interface 202 provides the loyalty agent 114 with the payment instrument identifier of a payment instrument 104 that does not have a fingerprint registered with the payment integrated loyalty system 100. The customer, through user interface 202, requests that the loyalty agent 114 register the payment instrument 104 fingerprint with an existing customer account.

Steps 804 and 806 are performed similar to steps 504 and 206 as they are described in connection with FIG. 5. In example embodiments, the payment agent 120 is a server (not shown here) operated by the payment integrated loyalty system 100, in communication with the loyalty agent 114.

At step 808, the loyalty agent 114 requests that the loyalty server 110 update the existing customer account with the fingerprint. Step 808 may include the loyalty agent 114 requesting that the loyalty server 110 link the particular fingerprint to a particular loyalty system, for example linking the fingerprint as a default fingerprint for all loyalty systems, or as a default fingerprint for some but not all loyalty systems. In some example embodiments a customer may wish to alter default or preferred fingerprints for particular loyalty systems in order to accrue/redeem loyalty entitlements for a preferred loyalty systems, maximizing those reward entitlements. As well, for example, using a credit card payment instrument 104 at the POS terminal 106 within a particular retailer may lead to greater loyalty entitlements under loyalty system A as compared to loyalty system B.

Optionally, at step 810, the loyalty agent 114 may notify the customer via user interface 202 that the customer account has been updated to include the payment instrument 104. As described in relation with step 226, the notification may be performed by the user interface 202 comprising a variety of output modules, include for example a printing module to print a receipt, and so forth.

Figure 9:
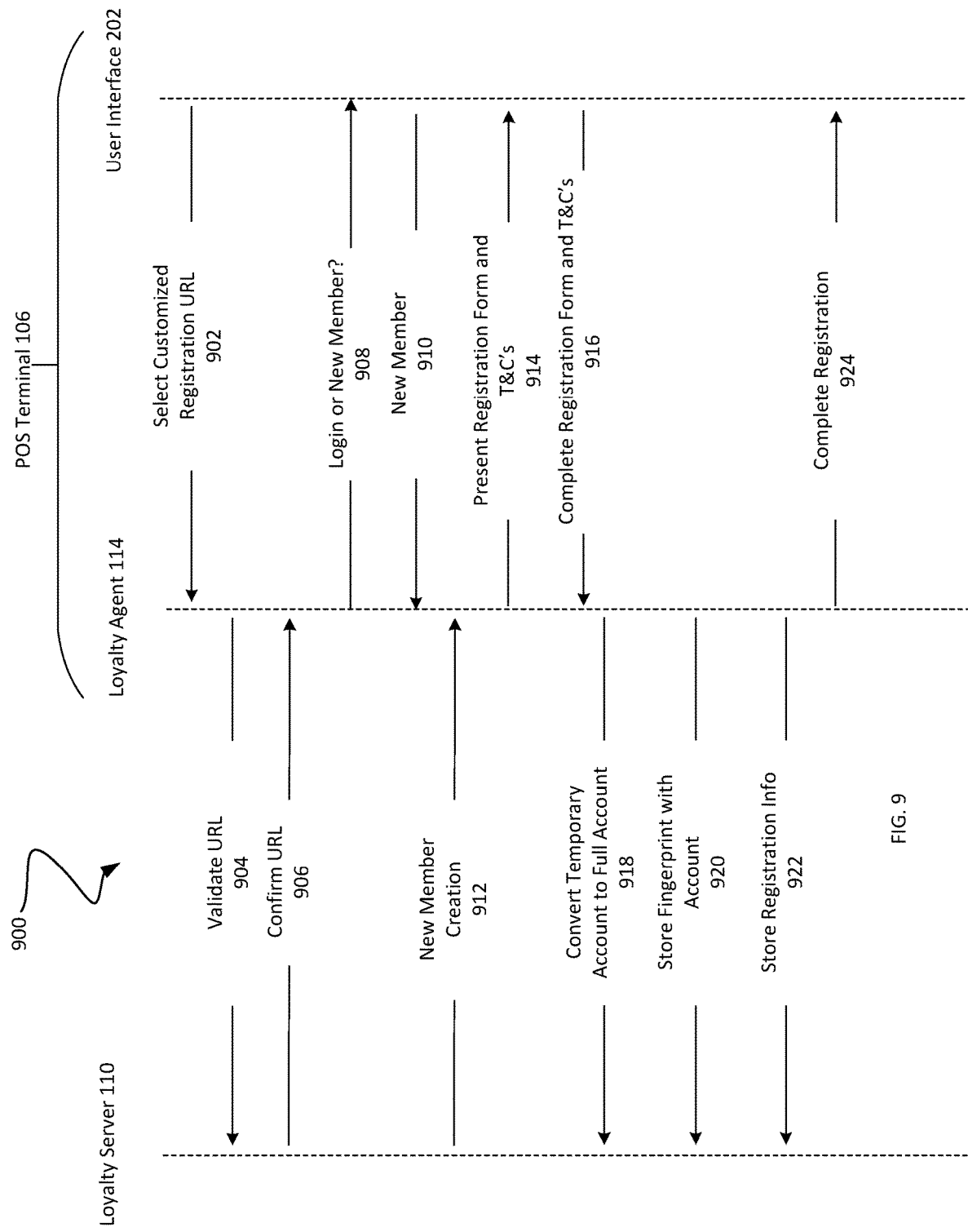
FIG. 9 is a flow diagram showing messages using the payment integrated loyalty system of FIG. 1 subsequent to FIG. 4, 7 or 14 to register for a loyalty system in accordance with another example embodiment.

Reference is now to FIG. 9, which illustrates a flow diagram of an example method 900 showing messages within the payment integrated loyalty system 100 to register for a loyalty system, in accordance with an example embodiment. In example embodiments, the method 900 is performed subsequent to methods 500 or 800 for signing up a customer.

At step 902, a user interface 202 establishes communication with a loyalty agent 114 to request to update a customer account. The request to update the customer account may include of a customized URL, received for example pursuant to steps 432, which may include the relevant loyalty server 110 for the request, and the relevant unregistered account stored in the card mapping database 412. In example embodiments, the request to update the customer account may include a request to access to a general registration process provided by the loyalty agent 114, for example via the Internet. If the loyalty agent 114 is operated on the POS terminal 106, the request to update the customer account may be selecting an option to register on the POS terminal 106.

In example embodiments, described below in greater detail in regards to FIG. 10, the user interface 202 may allow a customer to proceed with the method 1000 in which the user interface 202 receives an input to register, at the loyalty agent 114, additional fingerprints to an existing customer account. Pursuant to method 1100, described below in greater detail, the user interface 202 may establish communication with the loyalty agent 114 for adding at least one loyalty system account to an existing customer account. In example embodiments, the user interface 202 may allow a customer to register the fingerprint to all loyalty systems the existing customer account is associated with. In example embodiments, the loyalty agent 114 automatically enrolls the added fingerprint to all loyalty systems the existing customer account is associated with.

Referring again to the FIG. 9, in some examples, the communication is established by the user interface 202 sending a request to access a URL or accessing a customer sign-up website via the computing device (not shown) operating the user interface 202. The URL may be customized for the particular purpose that the user interface 202 intends to communicate with loyalty agent 114, for example a registration for a particular customer account. In example embodiments, the customer, via the user interface 202, is provided or guided to choose from a list of available URLs to establish the communication. For example, the user interface 202 may receive a selection to register to a particular loyalty program via a customized URL in order to increase the speed of registration.

At step 904, the loyalty agent 114 sends the request to update a customer account to the loyalty server 110. The loyalty server 110 may validate the customized URL received from the loyalty agent 114. The loyalty server 110 may store the customized URL as part of the loyalty system account. Similarly, the loyalty agent 114 may store the customized URL as part of the customer account.

At step 906, the loyalty server 110 sends the loyalty agent 114 confirmation of having received the valid URL.

At step 908, the loyalty agent 114 requests from the customer via the user interface 202 whether to access an existing customer account or to create a new customer account. The request may include prompting the user interface 202 on a display screen of a computing device such as a mobile device, POS terminal 106, computer or the like. In example embodiments, the request to update a customer account may include information that a customer is already registered, such that step 908 is not performed.

At step 910 the loyalty agent 114 receives a registration request confirmation from the user interface 202. In example embodiments, shown for example in FIG. 10, the loyalty agent 114 pulls the required registration information from the loyalty server 110.

At step 912, the loyalty server 110 provides the loyalty agent 114 with the required registration information. For example, similar to the description of step 424 in FIG. 5, the required registration information may indicate that a name, postal card, payment card information, accepting terms and conditions, customer name and password are required. The payment instrument identifier is not provided to the loyalty server 110.

In some examples, as shown in step 912, the loyalty agent 114 sends a request for the required registration information to the loyalty server 110 and awaits a response. In some examples, the required registration information may have been provided in a previous step, for example step 422.

At step 914, and 916, similar to steps 432 and 430, the loyalty agent 114 requests and receives completed required registration information from the customer via the user interface 202.

The required registration information may include the agreeing of terms and conditions. In example embodiments, the required registration information can include information required to register for the payment integrated loyalty system 100 that was not collected previously, for example in step 432. In the cases which include step 432 collecting contact information, the required registration information may require additional information such as a name, address and so forth. In example embodiments, the required registration information is based on required registration information for loyalty systems (not shown) such that the payment integrated loyalty system 100 can register the customer to a loyalty system with the information requested in step 914 at a later date.

At step 916, the loyalty agent 114 receives a response to the request in step 914 with the completed required registration information from the user interface 202. In the event that the user interface 202 does not provide the completed required registration information, the loyalty agent 114 may prompt the user interface 202 for further information, or may terminate the process altogether.

At step 918, the loyalty agent 114 transmits a request to the loyalty server 110 data indicative of the new customer or account for the loyalty server 110 to associate the fingerprint with the new customer account or the existing customer account. The loyalty agent 114 converts the unregistered customer account, created for example pursuant to step 420, into a full or regular account with the completed registration information. In response to receiving the request in step 918, the loyalty server 110 may be configured to update the customer account stored in the card mapping database 116.

At steps 920 and 922, the loyalty agent 114 provides the fingerprint and required registration information, received pursuant to step 916, respectively, to the loyalty server 110. Steps 918, 920, and 922 may occur simultaneously, and steps 920 and 922 may occur in any order.

At step 924, in response to performing any of steps 918, 920, and 922, the loyalty agent 114 may provide a notification to a customer, via the user interface 202, that the registration has been completed. For example, the notification may include a text message, phone call, or email, etc. If the loyalty agent 114 and the user interface 202 are operated by the POS terminal 106, the notification may include for example printing a receipt, displaying a message, and so forth.

The customer may be registered with the payment integrated loyalty system 100 and initiate a financial transaction with a payment instrument 104 that is not registered with the payment integrated loyalty system 100.

Figure 10:
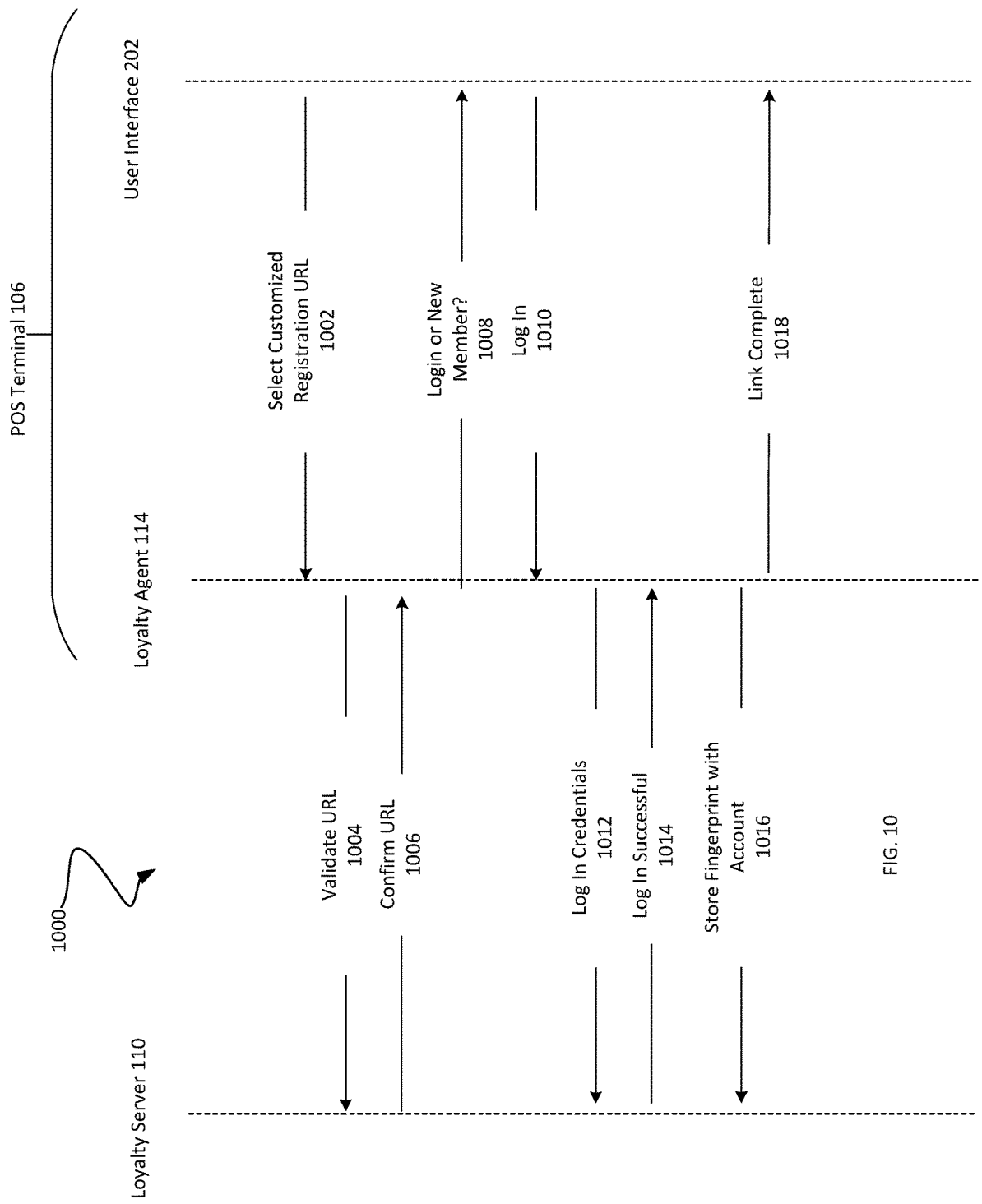
FIG. 10 is a flow diagram showing messages using the payment integrated loyalty system of FIG. 1 subsequent to FIG. 4, 7 or 14 to link a payment card in accordance with another example embodiment.

Reference is now made to FIG. 10, which shows a flow diagram of an example method 1000 showing messages within the payment integrated loyalty system 100 to link a payment card 105, in accordance with an example embodiment.

Steps 1002, 1004, 1006, and 1008 are performed analogous to steps 902, 904, 906 and 908, respectively, as set out in relation to FIG. 9.

At step 1010, the loyalty agent 114 receives a response to access an existing customer account in the payment integrated loyalty system 100. The response to access an existing customer account can include provided login information, such as a customer name, password, PIN, or the like.

At step 1012, the loyalty agent 114 provides the provided login information to the loyalty server 110. The loyalty server 110 determines whether the provided login information matches login information stored with respect to the customer account, for example in the customer account database 118. In example embodiments, the loyalty server 110 queries the card mapping database 116 in order to determine whether the provided login information matches the stored login information.

At step 1014, the loyalty server 110, in response to determining that the provided login information does match login information stored with respect to the customer account, sends confirmation of login to the loyalty agent 114.

If the loyalty server 110 determines that the provided login information does not match login information stored with respect to the customer account, the loyalty server 110 may notify the loyalty agent 114 of a failed login or not respond. In response to receiving the failed login, the loyalty agent 114 may notify the customer via user interface 202 of the failed login or terminate the process.

At step 1016, similar to step 920, the loyalty agent 114 sends the loyalty server 110 the fingerprint, as generated in step 206, for example, with a request to link the fingerprint to the customer account corresponding to the provided login information. The loyalty server 110 may be configured to query the card mapping database 116 to update the customer account with the information received in step 1016.

At step 1018, the loyalty agent 114 may provide a notification to the customer via the user interface 202 that the customer account has been updated with the fingerprint for the payment instrument 104 used to complete the financial transaction.

Figure 11:
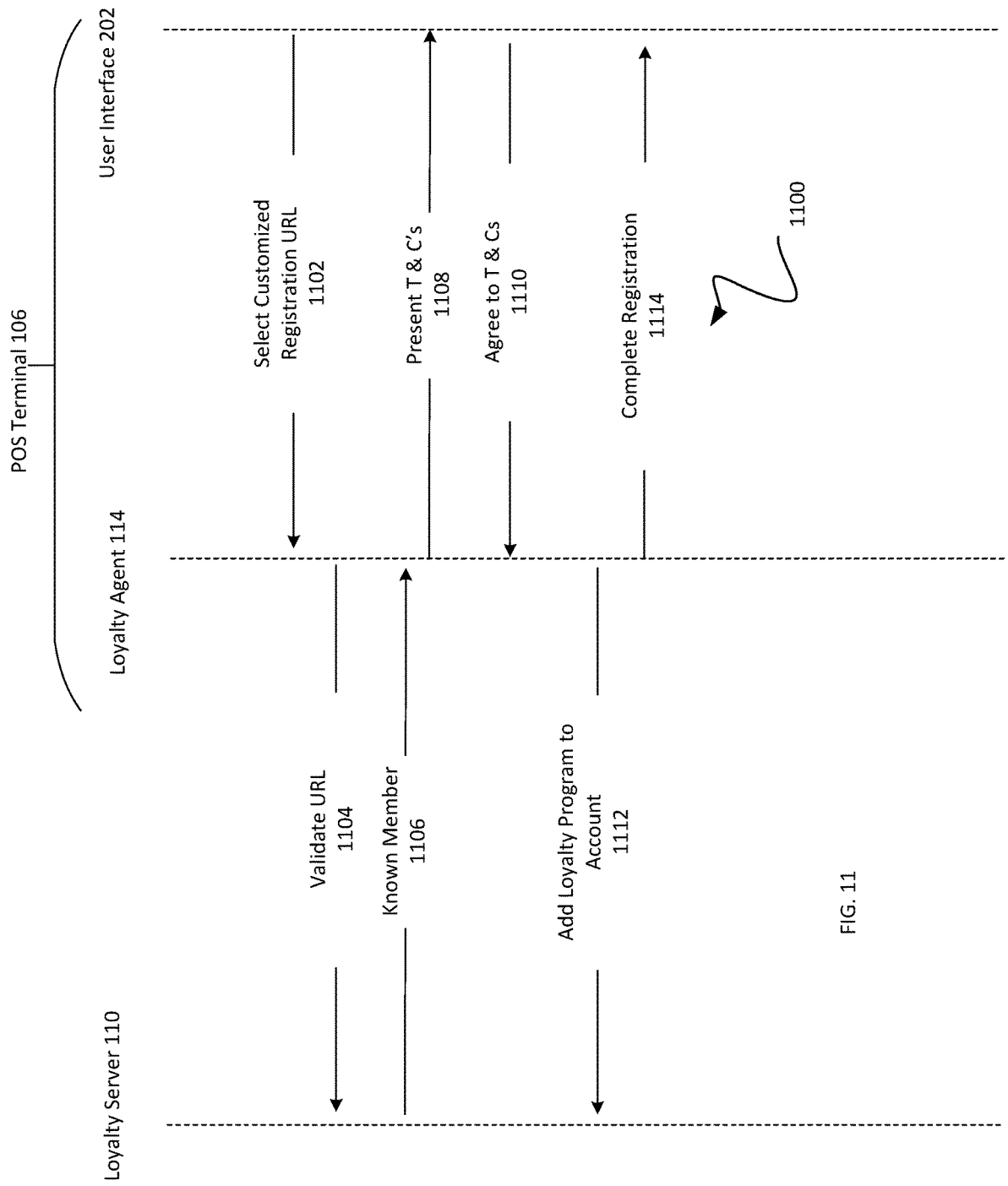
FIG. 11 is a flow diagram showing messages using the payment integrated loyalty system of FIG. 1 to register for a loyalty system in accordance with another example embodiment.

A customer may in some examples wish to add a loyalty system account to an existing customer account within the payment integrated loyalty system 100. Reference is now made to FIG. 11, which shows a flow diagram of an example embodiment 1100 showing messages within the payment integrated loyalty system 100 to register for a loyalty system. Method 1100 may be carried out if, for example at step 426, the loyalty agent 114 received a request to join a particular loyalty system.

Step 1102 and 1104 are carried analogous to steps 902 and 904, as set out herein.

The loyalty server 110 determines the customer account related to the request received in step 1104.

At step 1106, the loyalty server 110 notifies the loyalty agent 114 that the customer account received in relation to the request received in step 1104 exists. The notification may include required registration information for the selected loyalty system. For example, the loyalty server 110 may provide the loyalty agent 114 with the Air Miles™ specific terms and conditions be agreed to in order to complete registration.

At steps 1108 and 1110, similar to steps 914 and 916, the loyalty agent 114 requests and receives the completed required registration information for the selected loyalty system from the user interface 202.

At step 1112, the loyalty agent 114 sends a request to the loyalty server 110 to register the identified customer account for the selected loyalty system with the completed required registration information for the selected loyalty system received in step 1110.

At step 1114, the loyalty agent 114 may provide a notification that the registration to the selected loyalty system has been completed to the user interface 202, similar to step 1022.

In example embodiments, the loyalty agent 104 may determine that a fingerprint is associated with an existing customer account, but not with the loyalty system of the operator of the POS terminal 106, and in response automatically perform steps 1104, 1106, 1108, 1110, 1112, and 1114 to register a customer to the loyalty system of the operator of the POS terminal 106 with existing registration information in the customer account. For example, a customer may be automatically enrolled with the loyalty system of the operator of the POS terminal 106 without the need to fill in a registration form by submitting customer login or customer identification information.

Figure 13:
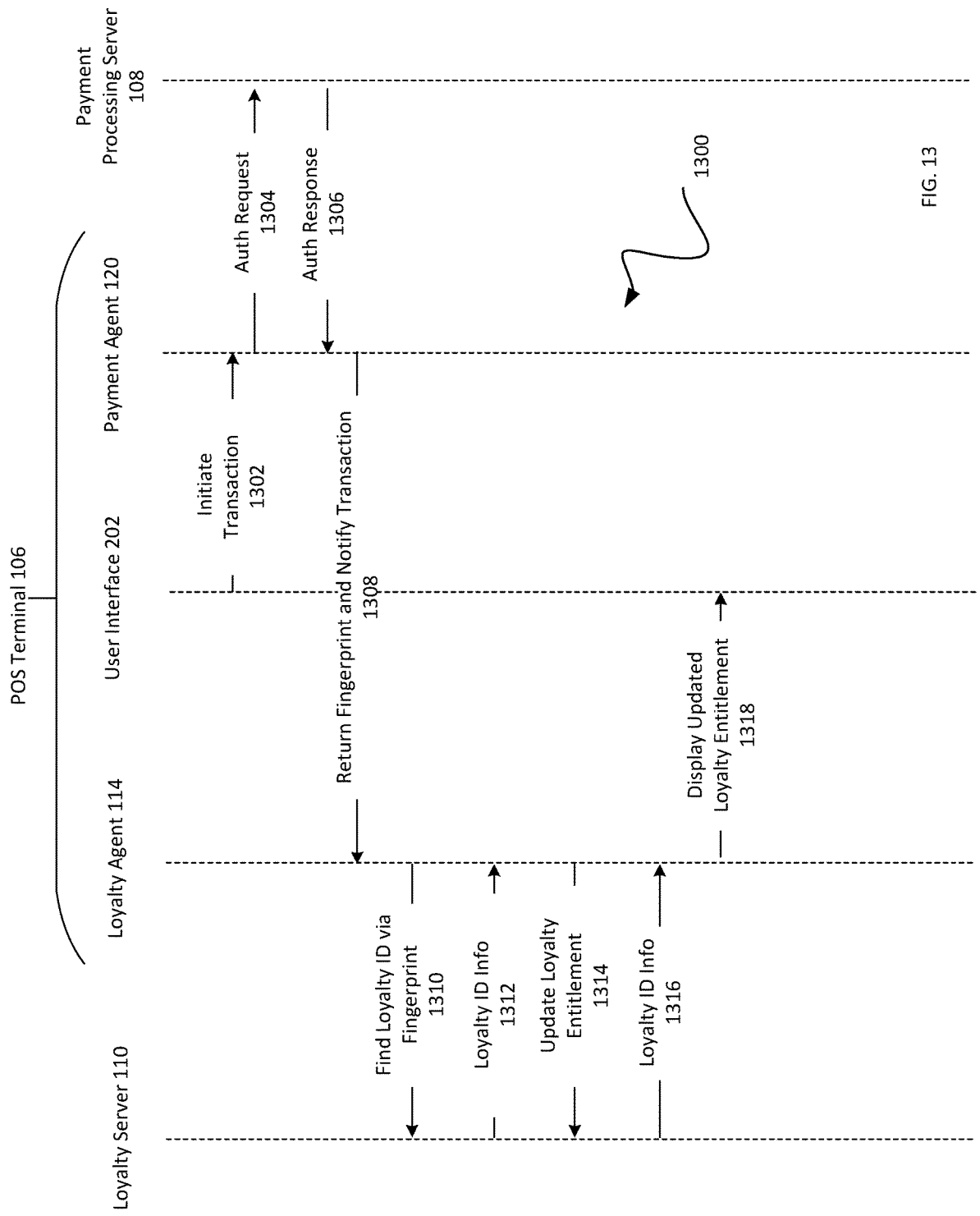
FIG. 13 is a flow diagram showing messages using the payment integrated loyalty system of FIG. 1 to accumulate loyalty entitlements in accordance another example embodiment.
Figure 14:
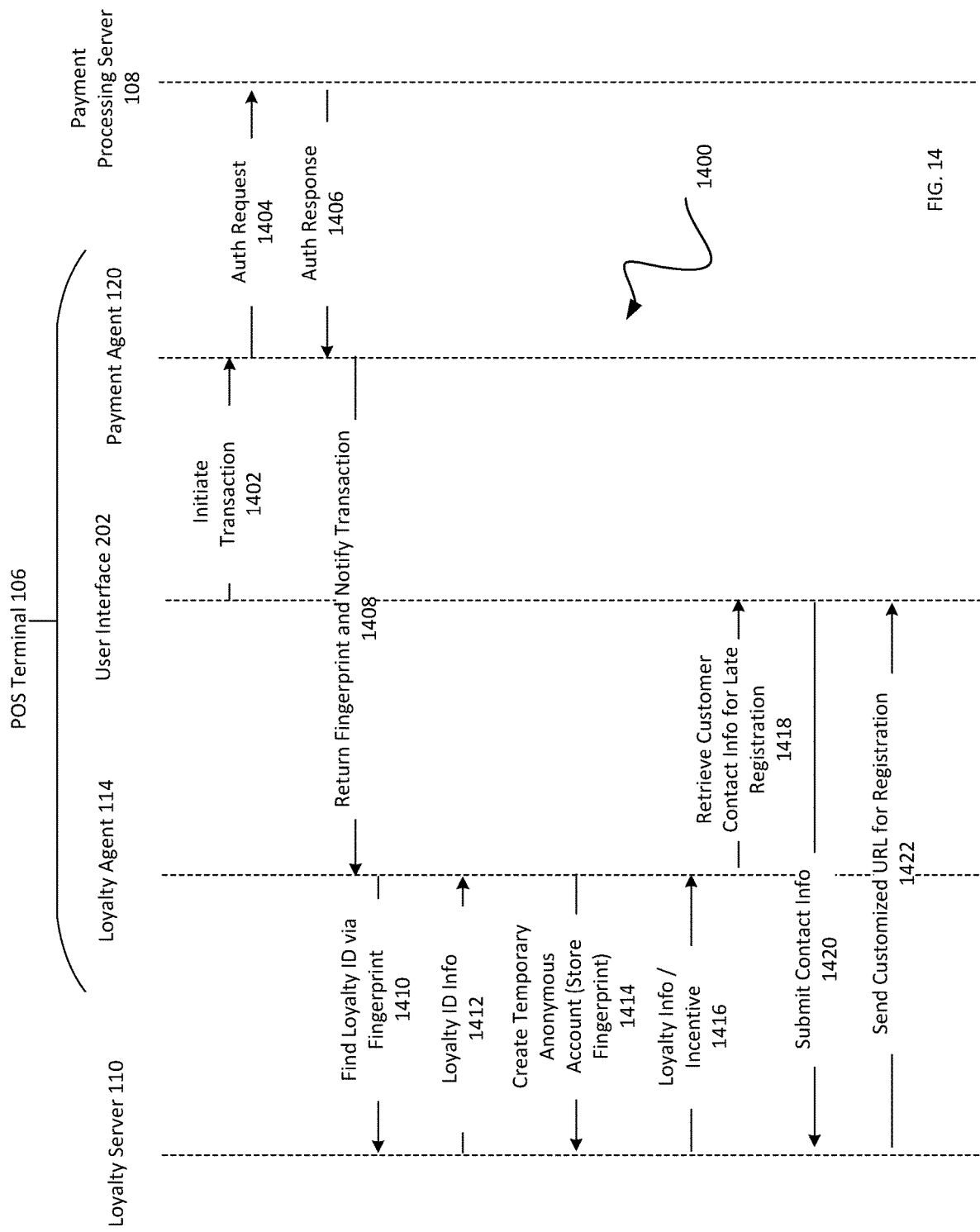
FIG. 14 is a flow diagram showing messages using the payment integrated loyalty system of FIG. 1 to redeem loyalty entitlements in accordance with another example embodiment.

FIGS. 13 and 14 show example embodiments of the payment integrated loyalty system 100 operating in an alternate method as compared to FIGS. 2 and 3, respectively.

Reference is now made to FIG. 13, which shows a flow diagram of an example method 1300 showing messages within the payment integrated loyalty system to accumulate loyalty entitlements, in accordance with an example embodiment.

Method 1300 performs steps 1302, 1304 and 1306 similar to steps 204, 218, and 220, respectively, as set out in the description in regards to FIG. 2, prior to contacting the loyalty agent 114. Step 1302 in method 1300 may include information specifying that the customer is seeking to accumulate loyalty.

At step 1308, the loyalty agent 114 receives the financial transaction authorization from the payment agent 120. In example embodiments, step 1308 includes the loyalty agent 114 receiving the fingerprint from the payment agent 120.

As described to above, in example embodiments, the fingerprint may be generated based on the card token returned by the payment processing server 108 to the payment agent 120.

At steps 1310, 1312, and 1314, steps 208, 210, 224, respectively, of FIG. 2 are followed as described therein. For clarity, the loyalty agent 114, provides the fingerprint to the loyalty server 110, receives the customer account information, including the loyalty balance from the loyalty server 110, and requests that the customer account allocate loyalty, based on the amount of the financial transaction In method 1300, the loyalty agent 114 may be configured to again request the customer account information from the loyalty server 110, including the updated loyalty balance, in step 1316.

At step 1318, similar to step 226 of FIG. 2, the loyalty agent 114 outputs the updated loyalty balance to the user interface 202.

Referring to FIG. 14, an example method 1400 is shown of performing the redemption transaction in the payment integrated loyalty system 100, according to example embodiments.

Steps 1402, 1404, 1406, 1408, 1410, and 1412 are carried out in a manner similar to steps 204, 218, 220, 1306, 208, and 210 as set out herein. Step 1402 in the example of method 1400 includes a request to redeem loyalty entitlements.

At step 1414, 1418, 1420, and 1422, analogous steps 422, 428, 434, and 436, respectively, are performed as described herein.

FIG. 15 is a block diagram of the payment integrated loyalty system operating in accordance with method 1500.

At step 1502, pursuant to the financial transaction the POS terminal 106 receives the payment instrument identifier of payment instrument 104 from the user interface 202. The user interface 202, as described above, may receive the payment instrument identifier from a customer device that is not a payment instrument 104, such as a mobile device loaded with a dedicated application, sometimes referred to as a "mobile wallet."

The payment instrument identifier can include any one, in any combination, a primary account number (PAN), a credit card number, and so forth.

At step 1504, the POS terminal 106 receives the amount of the financial transaction. As described above, the amount of the financial transaction can be provided to the POS terminal 106 via a user interface 202, which user interface 202 may in part be operated by a merchant.

In example embodiments, steps 1502 and 1504 occur simultaneously. The steps 1502 and 1504 can also occur in any order relative to one another.

At step 1506, the POS terminal 106 one-way encrypts the payment instrument identifier received in step 1502 to generate the fingerprint. In example embodiments, as described above, the fingerprint is generated based on the payment instrument identifier without considering the card token generated in response to the financial transaction being authorized.

One-way encrypting can include hashing the payment instrument identifier, salting the payment instrument identifier prior to hashing the payment instrument identifier, concatenating other data or identifiers prior to hashing, hashing data based on a transformed or coded version of at least the payment instrument identifier, and so forth.

At step 1508, the POS terminal 106 transmits to a loyalty server 110, the fingerprint without transmitting the payment instrument identifier. The payment instrument identifier may be unknown to the first server, and/or the payment instrument identifier is inaccessible to the first server.

In example embodiments which include the POS terminal 106 receiving the amount of the financial transaction at step 1504 prior to step 1508, the POS terminal 106 may be configured at step 1508 to transmit the data representative of the amount of the financial transaction, prior to the receiving, from the loyalty server 110, the loyalty balance associated with the fingerprint, as described below in greater detail. The data representative of the amount of the financial transaction may includes a loyalty amount equivalent to the amount of the financial transaction.

At step 1510, the POS terminal 106 receives from the loyalty server 110 a loyalty balance associated with the fingerprint. The received loyalty balance may reflect an updated loyalty balance due to the amount of the financial transaction if the data representative of the amount of the financial transaction is provided to the loyalty server 110 prior to receiving the loyalty balance. The received loyalty balance may simply reflect the current loyalty balance prior to the financial transaction of the customer account associated with the fingerprint.

It may be that at step 1510, the POS terminal 106 receives, from the loyalty server 110, an indication that there is no customer account associated with the fingerprint. In such an example, the POS terminal 106 may prompt, through the user interface 202, whether a new customer account or an existing customer account is to be associated with the fingerprint. If the POS terminal 106 receives a response to the request, the POS terminal 106 may be configured to transmit, to the loyalty server 110, data indicative of the new customer or account or the existing customer account for the loyalty server 110 to associate the fingerprint with the new customer account or the existing customer account.

At step 1512, the POS terminal 106 transmits, to the loyalty server 110, data representative of the amount of the financial transaction. In some example embodiments, as indicated in FIG. 15, step 1512 occurs after both steps 1504 and a loyalty balance has been received. It may be that step 1512 occurs subsequent to the POS terminal 106 receiving the amount of the financial transaction in step 1504. For example, the step 1512 may occur at the same time as step 1508. In some examples, transmitting, to the loyalty server 110, the data representative of the amount of the financial transaction is performed in response to the receiving, from the payment processing server 108, a response to the payment authorization request that the amount of the financial transaction has been authorized in step 1516, described below. In those examples, the received loyalty balance from the loyalty server 110, which may be send subsequent to the authorization in step 1516 and 1512, reflects an updated loyalty balance due to the amount of the financial transaction.

At step 1514, the POS terminal 106 transmits to the payment processing server 108, a payment authorization request for authorization of the amount of the financial transaction received at step 1504.

In example embodiments, the payment authorization request for authorization of the amount of the financial transaction can be based on a loyalty redemption amount to be deducted from the loyalty balance received as a result of a prompt on the customer interface 102. In examples in which the prompt receives a response including the loyalty redemption amount, the amount of the financial transaction reflects the loyalty redemption amount that is deducted and the payment authorization request for authorization of the amount of the financial transaction is performed in response to receiving the loyalty redemption amount from the prompting.

At step 1516, the POS terminal 106 receives from the payment processing server 108, a response to the payment authorization request that the amount of the financial transaction has been authorized.

Referring again to step 1512, the POS terminal 106 may be configured to receive, subsequent to sending the loyalty server 110 the data representative of the amount of the financial transaction, an updated loyalty balance due to the amount of the financial transaction from the loyalty server 110.

If the POS terminal 106 receives the loyalty balance, for example in step 1510, or an updated loyalty balance pursuant to steps 1512 followed by step 1510, the POS terminal 106 may be configured to output the loyalty balance to the user interface 202 of the POS terminal 106.

As is shown in FIG. 15, steps 1502, 1504, 1514, and 1516 may be performed at in parallel with steps 1502, 1506, 1508, and 1510.

Figure 16A:
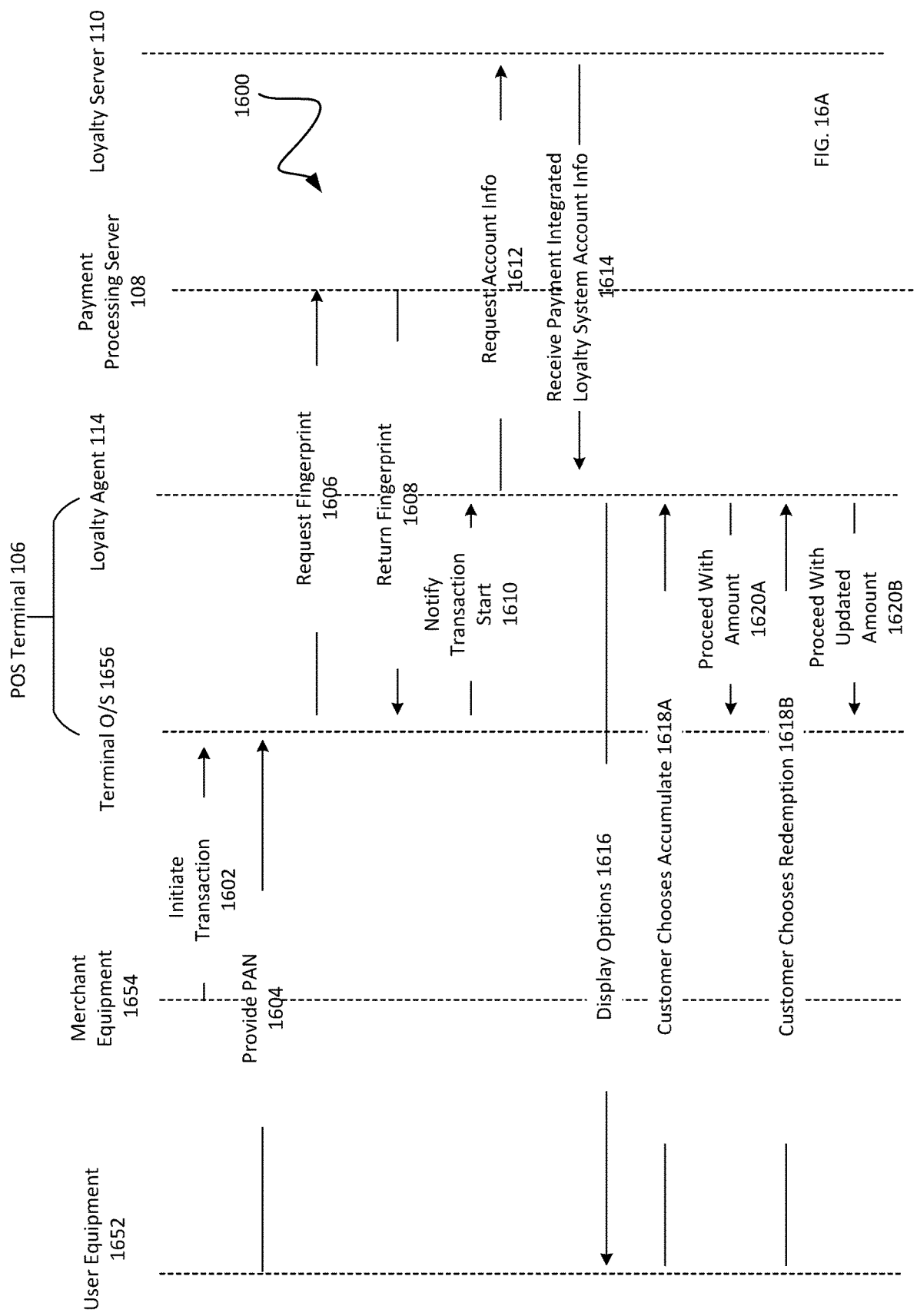
FIG. 16A is a flow diagram showing messages using the payment integrated loyalty system of FIG. 1 to redeem or accumulate loyalty entitlements in accordance with another example embodiment.

Referring to FIG. 16A, an example method 1600 is shown of performing the redemption transaction or the accumulation transaction in the payment integrated loyalty system 100, according to example embodiments.

At step 1602, a merchant equipment 1654, which in example embodiments is a subsystem of the POS terminal 106, initiates the transaction with the POS terminal operating system (O/S) 1656. As discussed herein, the merchant equipment 1654 may provide the POS terminal O/S 1656 the transaction amount.

At step 1604, a customer using user equipment 1652 provides the POS terminal O/S 1656 the payment instrument identifier. The user equipment 1652 may provide the payment instrument identifier via the smart card, for example.

At step 1606, the POS terminal O/S 1656 requests the fingerprint from the payment processing server 108.

At step 1608, the payment processing server 108 provides the fingerprint to the POS terminal O/S 1656.

At step 1610, the POS terminal O/S 1656 initiates or notifies the loyalty agent 114 to start a loyalty transaction and provides the fingerprint to the loyalty agent 114.

At step 1612, the loyalty agent 114 requests, from the loyalty server 110, information related to the payment integrated loyalty account related to the fingerprint. The information may be similar to the information described in relation to step 210.

At step 1614, the loyalty agent 114 receives, from the loyalty server 110, information related to the payment integrated loyalty account related to the fingerprint.

At step 1616, the POS terminal O/S 1656, via the user interface 202, requests a selection. The request may include the available transactions, such as the redemption transaction, and the accumulation transaction. For example, where the payment integrated loyalty system account associated with the fingerprint does not have a loyalty balance to support a redemption transaction, a redemption transaction will not be included in the request.

At step 1618A, the POS terminal O/S 1656, via the user interface 202, receives a request for an accumulation transaction, and at step 1620A notifies the POS terminal O/S 1656 that the amount of the financial transaction is updated to be unchanged.

At step 1618B, the POS terminal O/S 1656, via the user interface 202, receives a request for a redemption transaction, and at step 1620B updates the amount of the financial transaction at the POS terminal O/S 1656, based on the received request for a redemption transaction, which may include an amount of loyalty balance to apply to the financial transaction.

Figure 16B:
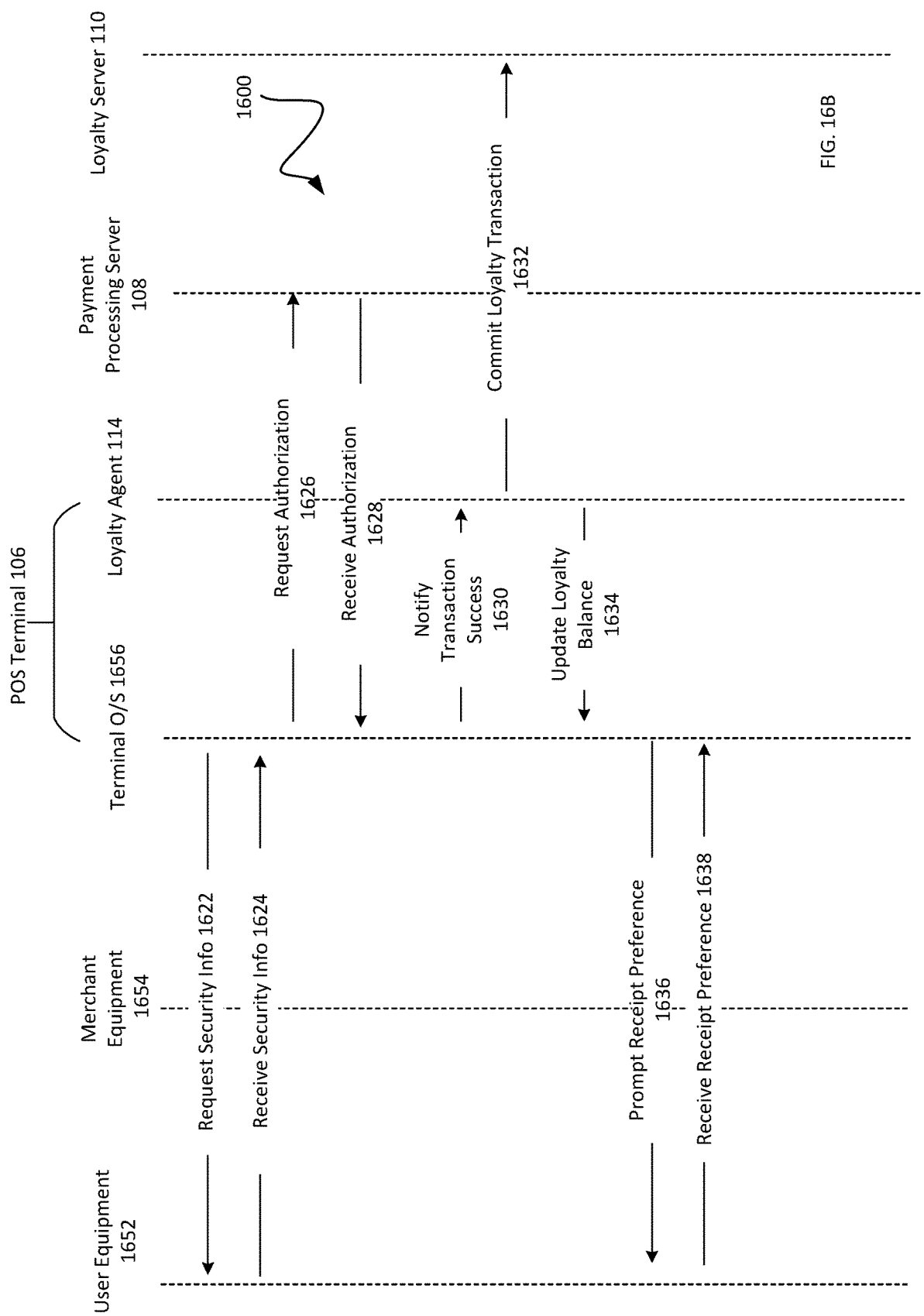
FIG. 16B is a flow diagram showing messages using the payment integrated loyalty system of FIG. 1 to redeem or accumulate loyalty entitlements in accordance with another example embodiment.

Method 1600 is continued in FIG. 16B.

At step 1622, the POS terminal O/S 1656 requests security information required to complete the financial transaction. For example, the POS terminal O/S 1656 may require a signature of the customer.

At step 1624, the POS terminal O/S 1656 receives the required security information.

Steps 1626, and 1628 are analogous to steps 518 and 520 in FIG. 5.

At step 1630, the POS terminal O/S 1656 notifies the loyalty agent 114 that the financial transaction has been successful completed.

Steps 1632, and 1634 are analogous to steps 522, and 524 in FIG. 5.

At step 1636, the POS terminal O/S 1656 requests a receipt preference. The request may include the options of a printed receipt, a digital receipt (such as an email receipt), a notification via SMS that the transaction has been completed, or no receipt at all.

At step 1638, the POS terminal O/S 1656 receives a receipt preference.

Referring to FIG. 17, an example method 1700 is shown of performing the redemption transaction or the accumulation transaction in the payment integrated loyalty system 100, according to example embodiments.

Steps 1702, 1704, 1706, 1708, 1710, and 1712 are performed analogous to steps 1602, 1604, 1606, 1608, 1610, and 1612 in FIG. 16.

At step 1714, the POS terminal O/S 1656 receives a response from the loyalty server 110 that there is no account associated with the fingerprint.

At step 1716, the loyalty agent 114 provides, via the user interface 202, an offer to join the payment integrated loyalty system 100, similar to step 724 in FIG. 7. The offer may require a response with customer contact information in order to complete the registration.

At step 1718B, the loyalty agent 114 receives a refusal, and the method 1700 can proceed and complete the steps in FIG. 16B using an anonymous account, as described herein.

At step 1718A, the loyalty agent 114 receives a request to join the payment integrated loyalty system 100. The request to join, as discussed, includes customer contact information.

At step 1720, the loyalty agent 114 provides the customer contact information to the loyalty server 110.

At step 1722, the loyalty server 110 provides to the user equipment 1652 of the customer, via the user interface 202, means to complete the registration to the payment integrated loyalty system 100 at a later time. The means may comprise a URL leading to a registration link.

The method 1700 may proceed and complete the steps in FIG. 16B the registered account, as described herein.

In example embodiments the payment integrated loyalty system 100 may be configured to account for reversed financial transactions. Reference is now made to FIG. 19 which shows a method 1900 of using the payment integrated loyalty system 100 in response to reversed transactions in accordance with another example embodiment.

Steps 1902, 1904, and 1906 are carried out similar to steps 1402, 1404, and 1406, however the transaction in FIG. 19 is a reverse transaction. In example embodiments, the reverse transaction is a refund, partial refund, or credit. For example, a reverse transaction may be initiated in response to a customer request to return an item.

At step 1908, the loyalty agent 114 receives the fingerprint associated with the payment instrument, and a notification that the reverse transaction has been confirmed. In example embodiments, the loyalty agent 114 may determine that the loyalty balance of the customer account should be reduced in response to determining that notification indicates that a transaction which led to loyalty entitlements being accrued has been reversed. In example embodiments, the loyalty agent 114 may determine the loyalty balance of the customer account should be increased in response to determining that the transaction which led to loyalty entitlements being spent has been reversed.

Steps 1910 and 1912 are performed analogous to steps 1410 and 1412 by the loyalty agent 114 to determine the customer account associated with the fingerprint. In example embodiments, the loyalty agent 114 may use the information received in step 1912, including the loyalty balance, to determine an updated loyalty balance as a result of the reversed transaction.

At step 1914, the loyalty agent 114 sends a request to the loyalty server 110 to update the loyalty balance of the customer account associated with the fingerprint based on the determination in step 1908.

At step 1916, the loyalty agent 114 displays the updated loyalty balance resulting from the reverse transaction.

A payment integrated loyalty system 100 operated in accordance with the methods set out herein may allow for generalized loyalty system access across merchant locations and across different merchants that can be enabled using predominantly payment cards 105.

In the case of a security breach of the payment integrated loyalty system 100, for example, including the one-way encryption used to generate fingerprints being compromised, it may become necessary to change the salt and/or the hash algorithm itself, and therefore the fingerprints associated with the payment instrument 104. However, modifying the one-way encryption invalidates all stored fingerprints.

However, the payment integrated loyalty system 100 may be configured so that as each customer makes a financial transaction subsequent to the breach, they will be prompted as if they were using a new payment instrument 104 to add to their customer account. Over time, the database of card fingerprints will update as customers add updated fingerprints.

In another example embodiment, a re-fingerprint function may be implemented in the event of a security breach. The re-printing function can include reverse looking up payment cards 105 based on an existing fingerprint and then generating an updated fingerprint for the payment instrument 104, and updating the stored fingerprint with the updated fingerprint. The payment integrated loyalty system 100 can iterate through existing fingerprints, using the loyalty agent 114 for example, and generate new fingerprints based on a new encryption by, for example changing the hashing algorithm or changing the salting value or salting algorithm.

A payment integrated loyalty system 100 operated in accordance with the methods set out herein may allow for the same contactless experience serving both loyalty and payment purposes.

A payment integrated loyalty system 100 operated in accordance with the methods set out herein may allow for more customer friendly, efficient sign up for loyalty systems. For example, a POS terminal 106, upon receiving and sending the fingerprint to the loyalty agent 114, may receive a response from the loyalty agent 114 that the fingerprint is known, as set out in step 1106 in relation to FIG. 11 above, but that loyalty systems available from the POS terminal 106 are unregistered. The POS terminal 106 may prompt the customer to register to the available loyalty system(s), and utilize customer information stored in the customer account database 118 to register the customer for the available loyalty system. In example embodiments, the customer is able to register with a simple "one-click" action.

In example embodiments, payment integrated loyalty system 100 can allow a customer to redeem loyalty entitlements subsequent to the financial transaction being completed. For example, referring to FIG. 13, in example embodiments, steps 204, 218 and 220 are completed, prior to steps 208, 210, 212, and 314 from FIG. 3 being completed. The loyalty agent 114 may then attempt to resubmit the financial transaction to the payment processing server 108 for correction using the fingerprint and a transaction specific card token as a reference. The loyalty system entitlements would similarly the resubmitted to the loyalty server 110 and identified by the fingerprint.

In example embodiments, merchants may install the loyalty system 114 to the POS terminal 106 and passively register fingerprints with the payments integrated loyalty system 100 without requiring customers to register. The merchant may then be provided access to the unregistered accounts stored in the customer account database 118 to determine potential customer adoption.

In examples which include a customer not having registered to the payments integrated loyalty system 100 at a first instance, subsequent financial transactions by that customer using the payment instrument 104 may continue to accumulate loyalty entitlements in the unregistered account. The POS terminal 106 may be configured to prompt the customer via user interface 202 to register to the payments integrated loyalty system 100 during the subsequent financial transactions and allow the customer to receive the full loyalty entitlements accrued up to the registration.

In example embodiments, the payment integrated loyalty system 100 is able to update (accumulate, redeem, and join) any loyalty system entitlement (either individual merchant or coalition) using a consumer's payment instrument 104 at the point of purchase. The method may include the generation of a non-reversible, one-way transformation of the payment instrument identifier (cc, debit/Interac, electronic or physical, or other types of payment method) mapped to a customer's series or particular loyalty account. The method may include a set of one or more one-way hashes mapped to a single payment integrated loyalty system account. Unrecognized fingerprints for known payment integrated loyalty system accounts can get linked to existing accounts. The method can be implemented on the POS terminal 106, at the payment processor server, or on a gateway or 3rd party host in between. The method may comprise the payment instrument identifier not being known to the payment integrated loyalty system.

In example embodiments, a method to accumulate loyalty entitlement in a payment integrated loyalty system (either individual merchant or coalition) comprises receiving a payment instrument identifier at the point of purchase prior to a user joining the payment integrated loyalty system. The method may include the generation of a non-reversible, one-way transformation of the payment instrument identifier (cc, debit/Interac, electronic or physical, or other types of payment method) mapped to a customer's series or particular loyalty account. The method may include a set of one or more one-way hashes mapped to a single payment integrated loyalty system account. Unrecognized fingerprints for known payment integrated loyalty system accounts can get linked to existing accounts. The method can be implemented on the POS terminal 106, at the payment processor server, or on a gateway or 3rd party host in between. The method may comprise the payment instrument identifier not being known to the payment integrated loyalty system. The method can include pre-accumulation of points being added to the customer's unregistered account, and upon the customer registering for the payment integrated loyalty system adding the pre-accumulated points.

The steps and/or operations in the flowcharts and drawings described herein are for purposes of example only. There may be many variations to these steps and/or operations. For instance, the steps may be performed in a differing order, or steps may be added, deleted, or modified.

The coding of software for carrying out the above-described methods described is within the scope of a person of ordinary skill in the art having regard to the example embodiments. Machine-readable code executable by one or more processors of one or more respective devices to perform the above-described method may be stored in a machine-readable medium such as the memory of the data manager. The terms "software" and "firmware" are interchangeable and include any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may include a specific plurality of elements, the systems, devices and assemblies may be modified to include additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

The example embodiments are described at least in part in terms of methods, such that a person of ordinary skill in the art will understand that the example embodiments may also be directed to the various elements for performing at least some of the aspects and features of the described methods, be it by way of hardware, software or a combination thereof. Accordingly, the technical solution of the described embodiments may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may include any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor configured to execute the functions described herein. The term "database" may refer to either a body of data, a relational database management system (RDBMS), or to both. As used herein, a database may include any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The example embodiments are described with reference to the accompanying drawings, in which the embodiments are shown. However, many different embodiments may be used, and thus the description should not be construed as limited to the embodiments set forth herein. Rather, these embodiments are provided so that this disclosure will be thorough and complete. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except if indicated otherwise either explicitly or inherently by context.

The example embodiments may be embodied in other specific forms without departing from the subject matter of the claims. The described example embodiments are to be considered in all respects as being only illustrative and not restrictive. The example embodiments intend to cover and embrace all suitable changes in technology. The scope of the example embodiments is, therefore, described by the appended claims rather than by the foregoing description. The scope of the claims should not be limited by the embodiments set forth in the examples, but should be given the broadest interpretation consistent with the description as a whole.

What is claimed is:

1. A system comprising:
  a point of sale terminal comprising:
    a card reader;
    a communication subsystem configured to communicate with a payment instrument, and configured to communicate over a network with at least a card mapping database, a first server which is a loyalty server, and a plurality of different payment processing servers including a second server which is a payment processing server;
    at least one processor in communication with the communication subsystem and card reader, configured to execute a loyalty agent for communicating with the first server and the card mapping database, and a payment agent for communicating with the second server;
    wherein the payment agent is configured to:
      receive, via the card reader, a payment instrument identifier associated with the payment instrument;
      receive an amount of a financial transaction;
      obtain a fingerprint based on one-way encrypting the payment instrument identifier;
      transmit, to the loyalty agent, the fingerprint without transmitting the payment instrument identifier;
    wherein the loyalty agent is configured to:
      transmit, to the card mapping database via the communication subsystem, the fingerprint without transmitting the payment instrument identifier, wherein the card mapping database obtains a loyalty system account identifier associated with the fingerprint;
      receive, from the card mapping database via the communication subsystem, a loyalty balance associated with the fingerprint without the loyalty system account identifier;
    wherein the payment agent is configured to:
      transmit, to the second server via the communication subsystem, the payment identifier and a payment authorization request for authorization of the amount of the financial transaction;
      receive, from the second server, a response to the payment authorization request that the amount of the financial transaction has been authorized for the payment instrument identifier; and
      transmit, to the loyalty agent, data representative of the amount of the financial transaction;
    wherein the loyalty agent is configured to:
      transmit, to the first server, the data representative of the amount of the financial transaction;
    wherein the loyalty agent is by a third party operator to the loyalty system account identifier; and
    wherein the payment instrument identifier and the loyalty system account identifier is unknown to the loyalty agent.

2. The system of claim 1, wherein the payment agent being configured to obtain the fingerprint further comprises the payment agent configured to obtain the fingerprint from the second server.

3. The system of claim 1, wherein the payment agent being configured to obtain the fingerprint further comprises the payment agent configured to generate the fingerprint.

4. The system of claim 1, wherein the financial transaction is a refund transaction, wherein the transmitting the payment authorization request for the authorization of the amount of the financial transaction includes transmitting an amount of a refund for the refund transaction, wherein the receiving the loyalty balance includes receiving a reversal of a loyalty amount due to the refund transaction.

5. The system of claim 1, further comprising the card mapping database.

6. The system of claim 5, wherein the card mapping database stores an interrelation between a plurality of fingerprints and a plurality of loyalty system account identifiers.

7. The system of claim 6, further comprising a customer account database in which a remainder of other customer account information is stored on the customer account database and not the card mapping database.

8. The system of claim 1, further comprising the first server.

9. The system of claim 1, further comprising the second server.

10. A method pursuant to a financial transaction, the method comprising:
  from a point of sale terminal configured to communicate over a network with at least a card mapping database, a first server which is a loyalty server, and a plurality of different payment processing servers including a second server which is a payment processing server, and configured to execute a loyalty agent for communicating with the first server and the card mapping database, and a payment agent for communicating with the second server:
    from the payment agent:
      receiving a payment instrument identifier associated with a payment instrument;
      receiving an amount of the financial transaction;
      obtaining a fingerprint based on one-way encrypting the payment instrument identifier;
      transmitting, to the loyalty agent, the fingerprint without transmitting the payment instrument identifier;
    from the loyalty agent:
      transmitting, to the card mapping database, the fingerprint without transmitting the payment instrument identifier, wherein the card mapping database obtains a loyalty system account identifier associated with the fingerprint;
      receiving, from the card mapping database, a loyalty balance associated with the fingerprint without the loyalty system account identifier;

from the payment agent:
- transmitting, to the second server, the payment identifier and a payment authorization request for authorization of the amount of the financial transaction;
- receiving, from the second server, a response to the payment authorization request that the amount of the financial transaction has been authorized for the payment instrument identifier; and
- transmitting, to the loyalty agent, data representative of the amount of the financial transaction;

from the loyalty agent:
- transmitting, to the first server, the data representative of the amount of the financial transaction;

wherein the loyalty agent is by a third party operator to the loyalty system account identifier; and wherein the payment instrument identifier and the loyalty system account identifier is unknown to the loyalty agent.

11. The method of claim 10, wherein the fingerprint is a non-reversible, one-way transformation of the payment instrument identifier.

12. The method of claim 11, further comprising salting the payment instrument identifier, and wherein the one-way transformation includes hashing of the salted payment instrument identifier.

13. The method of claim 10, wherein the payment instrument identifier comprises at least a primary account number (PAN).

14. The method of claim 10, wherein the payment instrument identifier comprises at least a credit card number or a debit card number.

15. The method of claim 10, further comprising outputting, from the point of sale terminal, the loyalty balance to a user interface of the point of sale terminal.

16. The method of claim 15, wherein the loyalty balance reflects an updated loyalty balance due to the amount of the financial transaction.

17. The method of claim 16, wherein the transmitting, to the first server, the data representative of the amount of the financial transaction, is performed prior to the receiving, from the first server, the loyalty balance associated with the fingerprint.

18. The method of claim 16, wherein the financial transaction is a refund transaction, wherein the transmitting the payment authorization request for authorization of the amount of the financial transaction includes transmitting an amount of a refund for the refund transaction, wherein the receiving the loyalty balance includes receiving a reversal of a loyalty amount due to the refund transaction.

19. The method of claim 15, the loyalty balance reflects current loyalty balance prior to the financial transaction.

20. The method of claim 19, the method further comprising:
- receiving, from the first server, an updated loyalty balance due to the amount of the financial transaction; and
- outputting, through the user interface, the updated loyalty balance.

21. The method of claim 19, the method further comprising:
- prompting, through the user interface, a loyalty redemption amount to be deducted from the loyalty balance;
- wherein the amount of the financial transaction reflects the loyalty redemption amount that is deducted; and
- receiving, from the first server, an updated loyalty balance due to the amount of the financial transaction and/or the loyalty redemption amount; and
- outputting, through the user interface, the updated loyalty balance.

22. The method of claim 21, wherein the transmitting, to the second server, the payment authorization request for authorization of the amount of the financial transaction is performed in response to receiving the loyalty redemption amount from the prompting.

23. The method of claim 10, wherein the transmitting, to the first server, the data representative of the amount of the financial transaction is performed in response to the receiving, from the second server, a response to the payment authorization request that the amount of the financial transaction has been authorized; and wherein the loyalty balance reflects an updated loyalty balance due to the amount of the financial transaction.

24. The method of claim 10, wherein the data representative of the amount of the financial transaction includes a loyalty amount equivalent to the amount of the financial transaction.

25. The method of claim 10, wherein the payment instrument identifier is inaccessible to the first server and the loyalty agent.

26. The method of claim 10, wherein obtaining the fingerprint comprises the payment agent generating the fingerprint.

27. The method of claim 10, wherein obtaining the fingerprint comprises: receiving the fingerprint from the second server.

* * * * *

UNITED STATES PATENT AND TRADEMARK OFFICE
CERTIFICATE OF CORRECTION

PATENT NO. : 11,580,537 B2
APPLICATION NO. : 16/749479
DATED : February 14, 2023
INVENTOR(S) : Tarique Al-Ansari, Majid Abu Daia and Peter Gerard Nicholas Scheyen Page 1 of 1

It is certified that error appears in the above-identified patent and that said Letters Patent is hereby corrected as shown below:

In the Claims

In Column 33, Line 61 (Claim 1): "subsystem, the payment identifier and a payment" should read --subsystem, the payment instrument identifier and a payment--.

In Column 35, Lines 2-3 (Claim 10): "transmitting, to the second server, the payment identifier and a payment authorization" should read --transmitting, to the second server, the payment instrument identifier and a payment authorization--.

Signed and Sealed this
Twenty-fifth Day of April, 2023

Katherine Kelly Vidal
*Director of the United States Patent and Trademark Office*